(12) United States Patent
Walker et al.

(10) Patent No.: US 12,497,334 B2
(45) Date of Patent: Dec. 16, 2025

(54) YTTRIA-ZIRCONIA SINTERED CERAMICS FOR PLASMA RESISTANT MATERIALS

(71) Applicant: Heraeus Covantics North America LLC, Chandler, AZ (US)

(72) Inventors: Luke Walker, Chandler, AZ (US); Matthew Joseph Donelon, Chandler, AZ (US)

(73) Assignee: Heraeus Covantics North America LLC, Chandler, AZ (US)

( * ) Notice: Subject to any disclaimer, the term of this patent is extended or adjusted under 35 U.S.C. 154(b) by 243 days.

(21) Appl. No.: 18/576,020

(22) PCT Filed: Jul. 1, 2022

(86) PCT No.: PCT/US2022/073375
§ 371 (c)(1),
(2) Date: Jan. 2, 2024

(87) PCT Pub. No.: WO2023/283536
PCT Pub. Date: Jan. 12, 2023

(65) Prior Publication Data
US 2024/0308918 A1   Sep. 19, 2024

Related U.S. Application Data

(60) Provisional application No. 63/219,133, filed on Jul. 7, 2021.

(51) Int. Cl.
*C04B 35/505* (2006.01)
*C04B 35/626* (2006.01)
(Continued)

(52) U.S. Cl.
CPC ...... *C04B 35/505* (2013.01); *C04B 35/62645* (2013.01); *C04B 35/645* (2013.01);
(Continued)

(58) Field of Classification Search
CPC ............ C04B 35/505; C04B 35/62645; C04B 35/645; C04B 38/0054; C04B 2235/3225;
(Continued)

(56) References Cited

U.S. PATENT DOCUMENTS 5,798,016 A   8/1998   Oehrlein et al.
5,911,852 A   6/1999   Katayama et al.
(Continued)

FOREIGN PATENT DOCUMENTS

CN   104529449 A   4/2015
CN   108002828 A   5/2018
(Continued)

OTHER PUBLICATIONS

[NPL-1] Chen et al. (CN 111620692 A); Sep. 4, 2020 (European Patent Office machine translation to English). (Year: 2020).*

*Primary Examiner* — Donald M Flores, Jr.
(74) *Attorney, Agent, or Firm* — Dicke, Billig & Czaja, PLLC

(57) ABSTRACT

Disclosed is a ceramic sintered body comprising yttrium oxide and zirconium oxide wherein the ceramic sintered body comprises not less than 75 mol % to not greater than 95 mol % yttrium oxide and not less than 5 mol % to not greater than 25 mol % zirconium oxide, wherein the ceramic sintered body comprises porosity in an amount of less than 2% by volume, wherein a density of the ceramic sintered body does not vary by more than 2% relative to theoretical density across a greatest dimension. The ceramic sintered body has a grain size of from 0.4 to less than 2 um as measured according to ASTM E1 12-2010. The ceramic sintered body may be machined into plasma resistant components for use in plasma processing chambers. Methods of making are also disclosed.

15 Claims, 8 Drawing Sheets

(51) Int. Cl.
*C04B 35/645* (2006.01)
*C04B 38/00* (2006.01)
*H01J 37/32* (2006.01)

(52) U.S. Cl.
CPC .... C04B 38/0054 (2013.01); H01J 37/32495 (2013.01); *C04B 2235/3225* (2013.01); *C04B 2235/3246* (2013.01); *C04B 2235/5409* (2013.01); *C04B 2235/612* (2013.01); *C04B 2235/656* (2013.01); *C04B 2235/6581* (2013.01); *C04B 2235/662* (2013.01); *C04B 2235/666* (2013.01); *C04B 2235/762* (2013.01); *C04B 2235/785* (2013.01); *C04B 2235/786* (2013.01); *Y10T 428/26* (2015.01)

(58) Field of Classification Search
CPC .... C04B 2235/3246; C04B 2235/5409; C04B 2235/612; C04B 2235/656; C04B 2235/6581; C04B 2235/662; C04B 2235/666; C04B 2235/762; C04B 2235/785; C04B 2235/786; H01J 37/32495; Y10T 428/26

See application file for complete search history.

(56) References Cited

U.S. PATENT DOCUMENTS

| | | |
|---|---|---|
| 6,123,791 A | 9/2000 | Han et al. |
| 6,352,611 B1 | 3/2002 | Han et al. |
| 2008/0237543 A1 | 10/2008 | Kobayashi et al. |
| 2010/0156008 A1 | 6/2010 | Aalund |

FOREIGN PATENT DOCUMENTS

| | | | | |
|---|---|---|---|---|
| CN | 111285679 A | | 6/2020 | |
| CN | 111620692 A | * | 9/2020 | ........... C04B 35/622 |
| KR | 20140033587 A | | 3/2014 | |
| TW | 201925141 A | | 7/2019 | |
| WO | 2020206389 A1 | | 10/2020 | |
| WO | 2022072705 A2 | | 7/2022 | |

* cited by examiner

YTTRIA-ZIRCONIA SINTERED CERAMICS FOR PLASMA RESISTANT MATERIALS

TECHNICAL FIELD

The present disclosure relates in general to a plasma resistant ceramic sintered body comprising yttrium oxide and zirconium oxide and methods of making the same, and more particularly to plasma resistant chamber components fabricated from the sintered ceramic bodies.

BACKGROUND

Semiconductor processing requires the use of halogen-based gases as well as oxygen and other process gases in combination with high electric and magnetic fields to create environments suitable for plasma etch and deposition processes. These plasma etch and deposition environments are made within vacuum chambers for etching and depositing materials on semiconductor substrates. The harsh plasma environments necessitate the use of highly plasma resistant (corrosion and erosion resistant) materials for components in processing chambers. These chambers include component parts such as disks or windows, liners, gas injectors, rings, and cylinders that confine the plasma over the wafer being processed. These components have been formed from materials that provide resistance to corrosion and erosion in plasma environments and have been described, for example, in U.S. Pat. Nos. 5,798,016, 5,911,852, 6,123,791 and 6,352,611. However, these parts used in plasma processing chambers are continuously attacked by the plasma and, consequently, corrode, erode and roughen on the surfaces of the chamber parts that are exposed to the plasma. This corrosion and erosion contributes to wafer level contamination through the release of particles from the component surface into the chamber, resulting in semiconductor device yield loss.

Rare earth oxides, and among those, in particular, sintered bodies of yttrium oxide, $Y_2O_3$, and zirconium oxide, $ZrO_2$, are known to be chemically inert and exhibit high plasma (corrosion and erosion) resistance. However, there are several drawbacks to the use of rare earth oxides, and especially sintered bodies of yttrium oxide and zirconium oxide.

Yttrium oxide and zirconium oxide are known to be difficult to sinter to the high densities required with traditional methods, resulting in low density and significant porosity remaining in the final part or component. Residual porosity and low density leads to accelerated corrosion during plasma etch and deposition processes, thereby deteriorating plasma resistance of the component. Further, sintering yttrium oxide and zirconium oxide typically requires high temperatures of about 1800° C. and higher for prolonged periods of time. The high temperatures and lengthy sintering durations lead to exaggerated grain growth, adversely affecting mechanical strength of yttrium oxide and zirconium oxide bodies. High purity powders of yttria and zirconia pose challenges to sinter to the high densities required for application to semiconductor plasma processing chambers. In particular, the material properties of yttria and zirconia of high sintering temperatures and plasma resistance present challenges in sintering to high densities while maintaining the necessary high purity. In order to promote densification of the yttrium oxide and zirconium oxide bodies useful as plasma chamber components, sintering aids are often used to lower sintering temperatures and promote densification. However, the addition of sintering aids effectively degrades the corrosion and erosion resistance of the yttrium oxide and zirconium oxide materials and increases the probability of impurity contamination at a semiconductor device level.

Films or coatings of rare earth oxides such as yttrium oxide and zirconium oxide have been known to be deposited by aerosol or plasma spray techniques, atop a base or substrate formed of a different material which is lower in price and higher in strength than yttrium oxide and zirconium oxide. However, these methods are limited in film thicknesses that may be produced, displaying poor interfacial adhesion strength between the rare earth oxide film and the substrate, and high levels of porosity typically on the order of between 5% to 50%, levels of porosity, resulting in the shedding of particles into the process chamber.

Attempts to fabricate solid ceramic bodies for corrosion resistant components of large dimension made from rare earth oxides such as yttria-zirconia have been limited in success. Solid body components having diameters on the order of 100 mm and greater which may be handled and used as a part of a chamber wall without breakage or cracking are difficult to produce beyond a laboratory scale. This is owing to the typically low densities and sintered strengths of yttrium oxide and zirconium oxide. Attempts thus far to prepare large yttria-zirconia components have resulted in high porosity, low density, breakage and an inferior quality for their use in corrosion resistant applications. There may not currently be commercially available, large yttria-zirconia solid sintered bodies or components of diameter on the order of 100 mm to 622 mm for use in semiconductor etch and deposition applications.

As a result, there is a need in the art for a plasma resistant, ceramic sintered body having high density, low porosity, high purity, and high mechanical strength providing enhanced resistance to corrosion and erosion under plasma etch and deposition conditions (plasma resistance), particularly suited to fabrication of components of large dimension (100 to 622 mm diameter).

BRIEF SUMMARY

These and other needs are addressed by the various embodiments, aspects and configurations as disclosed herein:

Embodiment 1. A ceramic sintered body comprising yttrium oxide and zirconium oxide wherein the ceramic sintered body comprises not less than 75 mole % to not greater than 95 mol % yttrium oxide and not less than 5 mole % to not greater than 25 mol % zirconium oxide, wherein the ceramic sintered body comprises porosity in an amount of less than 2% by volume, wherein a density of the ceramic sintered body does not vary by more than 2% relative to theoretical density across a greatest dimension, wherein the ceramic sintered body has an average grain size of from 0.4 to less than 2 um as measured according to ASTM E112-2010.

Embodiment 2. The ceramic sintered body of embodiment 1 having at least one surface comprising yttrium oxide and zirconium oxide wherein the at least one surface is polished and comprises porosity in an amount of less than 2% by pore area of the at least one surface.

Embodiment 3. The ceramic sintered body of embodiment 2 wherein porosity as measured on a polished surface extends throughout the ceramic sintered body.

Embodiment 4. The ceramic sintered body of any one of the preceding embodiments 1 to 3 comprising yttrium oxide in an amount of from not less than 75 mole % to not greater than 85 mole % and zirconium oxide in an amount from not less than 15 mole % to not greater than 25 mole %.

Embodiment 5. The ceramic sintered body of any one of the preceding embodiments 1 to 4 comprising not less than 77 mole % to not greater than 83 mole % yttrium oxide and from not less than 17 mole % to not greater than 23 mole % zirconium oxide.

Embodiment 6. The ceramic sintered body of any one of the preceding embodiments 1 to 5 comprising not less than 78 mole % to not greater than 82 mole % yttrium oxide and from not less than 18 mole % to not greater than 22 mole % zirconium oxide.

Embodiment 7. The ceramic sintered body of any one of embodiments 4 to 6 having a density of from 5.01 g/cc to 5.13 g/cc as measured according to ASTM B962-17.

Embodiment 8. The ceramic sintered body of any one of embodiments 4 to 7 having a hardness of from not less than 8.5 to 14.5 GPa as measured according to ASTM Standard C1327.

Embodiment 9. The ceramic sintered body of any one of the preceding embodiments 1 to 8 having a purity of greater than 99.99% excluding $HfO_2$ and $SiO_2$ relative to 100% purity as measured using ICP-MS methods.

Embodiment 10. The ceramic sintered body of any one of the preceding embodiments 1 to 9 wherein the ceramic sintered body has a total impurity content of less than 100 ppm.

Embodiment 11. The ceramic sintered body of any one of the preceding embodiments 1 to 10 wherein the at least one crystalline phase comprises a cubic solid solution selected from the group consisting of fluorite, c-type cubic and combinations thereof.

Embodiment 12. The ceramic sintered body of any one of the preceding embodiments 1 to 11 having a pore diameter of not less than 0.1 to not greater than 5 um as measured across a polished surface.

Embodiment 13. The ceramic sintered body of any one of the preceding embodiments 1 to 12 having a pore diameter of not less than 0.1 to not greater than 3 um as measured across a polished surface.

Embodiment 14. The ceramic sintered body of any one of the preceding embodiments 1 to 13 having at least one surface with an average grain size of from 0.75 to 6 um as measured according to ASTM E112-2010.

Embodiment 15. The ceramic sintered body of any one of the preceding embodiments 1 to 14 comprising a c-type cubic solid solution phase.

Embodiment 16. The ceramic sintered body of any one of the preceding embodiments 1 to 15 having a greatest dimension of from 100 mm to 622 mm, preferably from 100 to 575 mm, preferably from 100 to 406 mm, preferably from 150 to 622 mm, preferably from 150 to 575 mm, preferably from 150 to 406 mm, preferably from 406 to 622 mm, and more preferably from 406 to 575 mm, each with regard to the longest extension of the sintered body.

Embodiment 17. The ceramic sintered body of any one of the preceding embodiments 1 to 16 wherein the ceramic sintered body is selected from the group consisting of a window, an RF window, a lid, a focus ring, a shield ring, a nozzle, a gas injector, a shower head, a gas distribution plate, a chamber liner, a chuck, an electrostatic chuck, a puck, and/or a cover ring in plasma processing chambers.

Embodiment 18. A method of making a ceramic sintered body, the method comprising the steps of combining powders of yttrium oxide and zirconium oxide to make a powder mixture; calcining the powder mixture by applying heat to raise the temperature of the powder mixture to a calcination temperature and maintaining the calcination temperature to form a calcined powder mixture; disposing the calcined powder mixture inside a volume defined by a tool set of a sintering apparatus and creating vacuum conditions inside the volume; applying pressure to the calcined powder mixture while heating to a sintering temperature and performing sintering to form the ceramic sintered body; and lowering the temperature of the ceramic sintered body.

Embodiment 19. The method according to embodiment 18 further comprising the steps of optionally annealing the ceramic sintered body by applying heat to raise the temperature of the ceramic sintered body to reach an annealing temperature to form an annealed ceramic sintered body; and lowering the temperature of the annealed ceramic sintered body.

Embodiment 20. The method according to any one of embodiments 18 to 19 further comprising the step of optionally machining the ceramic sintered body to form a ceramic sintered body component such as a window, an RF window, a lid, a focus ring, a shield ring, a nozzle, a gas injector, a shower head, a gas distribution plate, a chamber liner, a chuck, an electrostatic chuck, a puck, and/or a cover ring in plasma processing chambers.

Embodiment 21. The method according to any one of embodiments 18 to 20 wherein the calcined powder mixture has a purity of 99.99% and higher relative to 100% purity as measured using ICP-MS methods.

Embodiment 22. The method according to any one of embodiments 18 to 21 wherein the calcined powder mixture has a specific surface area (SSA) of from 2 to 14 m2/g, preferably from 2 to 12 $m^2$/g, preferably from 2 to 10 m2/g, preferably from 2 to 8 m2/g, preferably from 2 to 6 m2/g, preferably from 2.5 to 10 m2/g, preferably from 3 to 10 m2/g, preferably from 4 to 10 m2/g, and more preferably from 2 to 5 m2/g as measured according to ASTM C1274.

Embodiment 23. The method according to any one of embodiments 18 to 22 wherein the calcination temperature is from 600° C. to 1200° C.

Embodiment 24. The method according to any one of embodiments 18 to 23 wherein the pressure is from 10 to 60 MPa.

Embodiment 25. The method according to any one of embodiments 18 to 24 wherein the pressure is from 10 to 50 MPa.

Embodiment 26. The method according to any one of embodiments 18 to 25 wherein the pressure is from 10 to 40 MPa.

Embodiment 27. The method according to any one of embodiments 18 to 26 wherein the pressure is from 10 to 30 MPa.

Embodiment 28. The method according to any one of embodiments 18 to 27 wherein the pressure is from 15 to 40 MPa.

Embodiment 29. The method according to any one of embodiments 18 to 28 wherein the pressure is from 15 to 30 MPa.

Embodiment 30. The method according to any one of embodiments 18 to 29 wherein the pressure is from 15 to 25 MPa.

Embodiment 31. The method according to any one of embodiments 18 to 30 wherein the sintering temperature is from 1200° C. to 1700° C.

Embodiment 32. The method according to any one of embodiments 18 to 31 wherein the annealing temperature is from 800° C. to 1500° C.

Embodiment 33. A ceramic sintered body according to any one of embodiments 1 to 17 made according to the method of any one of embodiments 18 to 32.

It is to be understood that both the foregoing general description and the following detailed description are exemplary, but are not restrictive, of the disclosure.

BRIEF DESCRIPTION OF THE DRAWINGS

The disclosure is best understood from the following detailed description when read in connection with the accompanying drawings. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

Figure 1:
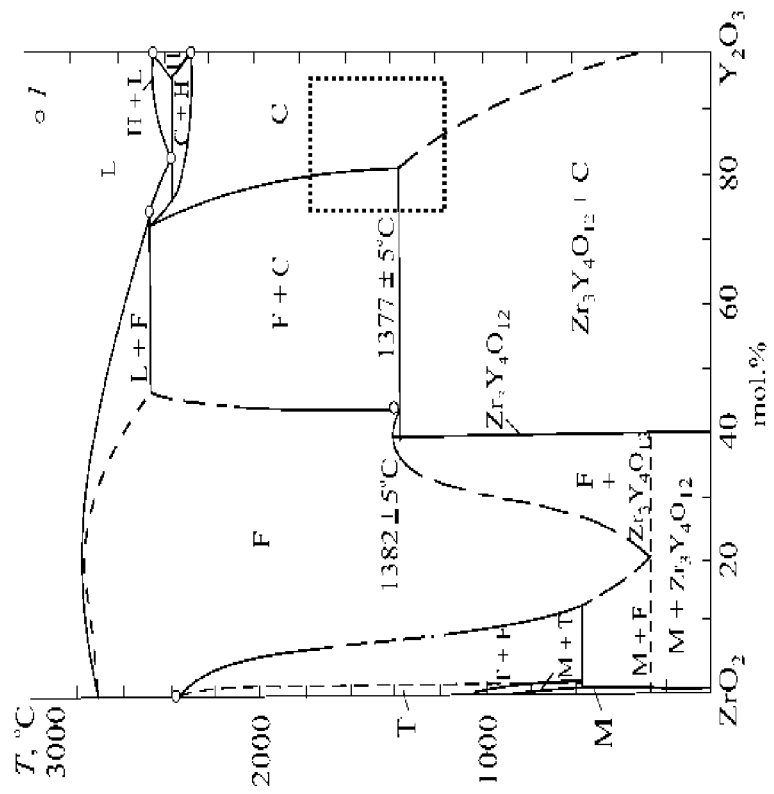
FIG. 1 illustrates a phase diagram for yttria and zirconia according to the present disclosure.

Reference will now be made in detail to specific embodiments. Examples of the specific embodiments are illustrated in the accompanying drawings. While the disclosure will be described in conjunction with these specific implementations, it will be understood that it is not intended to limit the disclosure to such specific embodiments. On the contrary, it is intended to cover alternatives, modifications, and equivalents as may be included within the spirit and scope as defined by the appended claims. In the following description, numerous specific details are set forth in order to provide a thorough understanding of the disclosed embodiments. The present disclosure may be practiced without some or all of these specific details.

As used herein, the term "zirconia" is understood to be zirconium oxide, comprising $ZrO_2$. As used herein, the term "alumina" is understood to be aluminum oxide, comprising $Al_2O_3$. As used herein, the term "yttria" is understood to be yttrium oxide, comprising $Y_2O_3$.

As used herein, the terms "semiconductor wafer," "wafer," "substrate," and "wafer substrate," are used interchangeable. A wafer or substrate used in the semiconductor device industry typically has a diameter of 200 mm, or 300 mm, 450 mm and larger as known in the industry.

As used herein, the term "ceramic sintered body" is synonymous with "sinter", "body" or "sintered body" and refers to a unitary, integral sintered ceramic article formed from compacting powders by application of pressure and heat which creates a unitary, dense, sintered ceramic body. The unitary, sintered ceramic body may be machined into a unitary, sintered ceramic component useful as a chamber component in plasma processing applications.

As used herein, the term "nanopowder" is intended to encompass those powders having a specific surface area (SSA) of 20 $m^2/g$ and greater.

As used herein, the term "purity" refers to the absence of various contaminants and/or impurities in a) a starting material from which a powder mixture may be formed, b) a powder mixture after processing, and c) a sintered ceramic body as disclosed herein. Higher purity, approaching 100%, represents a material having essentially no contaminants, dopants or impurities, comprising only the intended material composition of Y, Zr and O. Impurities differ from dopants in that dopants typically are those compounds intentionally added to the starting powders or to the powder mixture to achieve certain electrical, mechanical, optical or other properties such as grain size modification for example, in the sintered ceramic body.

As used herein, the term "impurity" refers to those compounds/contaminants present in a) the starting materials from which a powder mixture may be formed, b) a powder mixture and/or a calcined powder mixture after processing, and c) a sintered ceramic body, comprising impurities other than the starting material itself, which comprises Y, Zr and O. Impurities may be present in the starting powder materials, powder mixtures and/or calcined powder mixtures after processing/combining, or during sintering and are reported as ppm where lower ppm levels correspond to lower impurity content. Impurities as reported herein do not include Si in the form of $SiO_2$ or Hf in the form of HfO2. Yttria present in the starting zirconium oxide material is present as a stabilizer, and thus not considered an impurity.

Conversion from purity to impurity may be done using the conversion of 1% by weight is equal to 10,000 pm as known to those skilled in the art. All values when reported in ppm herein are relative to the total mass of the material to be measured, such as embodiments of the powders as disclosed herein, and/or the sintered ceramic bodies.

The term "sintering aid" as used herein refers to additives, such as calcia, silica or magnesia, that enhance densification, and thereby reduce porosity, during the sintering process.

As used herein, the term "ceramic sintered body component" refers to a ceramic sintered body after a machining step to create a specific form or shape as necessary for use in a plasma processing chamber for semiconductor fabrication.

As used herein, the term "powder mixture" means at least one powder mixed by methods as known to those skilled in the art of ball milling, jet milling, tumble mixing, drying, calcinating, sieving, purifying, and repetitions or combinations of these steps prior to a sintering process, which after sintering the powder mixture is formed into the disclosed ceramic sintered body and/or ceramic sintered body component.

As used herein, the term "tool set" may comprise at least a die and two punches and optionally additional spacer elements.

The term "phase" or "crystalline phase" are synonymous and as used herein are understood to mean an ordered structure forming a crystal lattice of a material, including a stoichiometric or compound phase or a solid solution phase. A "solid solution" as used herein is defined as a mixture of different elements that share the same crystal lattice structure. The mixture within the lattice may be substitutional, in which the atoms of one starting crystal replace those of the other, or interstitial, in which the atoms occupy positions normally vacant in the lattice.

The term "calcination" is understood to mean heat treatment steps which may be conducted on a powder in air at a temperature less than a sintering temperature to remove moisture and/or impurities, increase crystallinity and in some instances modify powder and/or powder mixture surface area.

The term "annealing" when applied to heat treatment of ceramics is understood herein to mean a heat treatment conducted on the disclosed ceramic sintered bodies or ceramic sintered body components to a temperature and allowed to cool slowly to relieve stress and/or normalize stoichiometry. Typically, air or oxygen containing environment may be used.

As used herein, the term "about" as it is used in connection with numbers allows for a variance of plus or minus 10%. The term "substantially," as used in this document, is a descriptive term that denotes approximation and means "considerable in extent" or "largely but not wholly that which is specified" and is intended to avoid a strict numerical boundary to the specified parameter.

The following detailed description assumes embodiments implemented within equipment such as etch or deposition chambers necessary as part of the making of a semiconductor wafer substrate. However, the disclosure is not so limited. The work piece may be of various shapes, sizes, and materials. In addition to semiconductor wafer processing, other work pieces that may take advantage of the embodiments as disclosed herein include various articles such as fine feature size inorganic circuit boards, magnetic recording media, magnetic recording sensors, mirrors, optical elements, micro-mechanical devices and the like.

During processing of semiconductor devices, corrosion resistant parts or chamber components are used within plasma processing chambers and exposed to harsh corrosive environments which may cause the release of particles into the reactor chamber, resulting in yield loss due to wafer-level contamination. The ceramic sintered body and related ceramic sintered body components as disclosed herein provide improved plasma resistance within semiconductor processing reactor chambers by way of specific material properties and features to be described following.

Embodiments disclosed herein provide a ceramic sintered body comprising from not less than 75 mole % to not greater than 95 mol % yttrium oxide and from not less than 5 mole % to not greater than 25 mol % zirconium oxide wherein the ceramic sintered body comprises porosity in an amount of less than 2% by volume and having a grain size of from 0.5 to 8 um as measured according to ASTM E112-2010. The ceramic sintered body has at least one surface comprising at least one crystalline phase comprising yttrium oxide and zirconium oxide, the surface having a porosity of less than 2% by pore area and a grain size of from 0.5 to 8 um. Porosity as measured on a polished surface may extend throughout the bulk of the ceramic sintered body, and as such, porosity on a polished surface is representative of volumetric, or bulk, porosity. The ceramic sintered body as disclosed herein may have a density of 98% and higher relative to a theoretical density as defined herein. The ceramic sintered body may be made from high purity powders of yttria and zirconia having a particle size distribution and surface area providing handleability, flowability and chemical reactivity.

FIG. 1 depicts the yttrium oxide/zirconium oxide phase diagram, illustrating the phases of yttrium oxide and zirconium oxide and the molar combinations to achieve them. Formation of the crystalline phases as depicted in the diagrams may be achieved by several parameters, such as the molar ratios of the starting powder mixtures, the degree of mixing, and purity of the starting powders. Sintering conditions such as ramp rates, temperatures and times, as well as annealing temperatures and times of the current and pressure assisted process as disclosed may also affect crystalline phase formation. Guidance for achieving these crystalline phases of yttria-zirconia are known to those skilled in the art as evidenced by the yttria zirconia phase diagram of Andrievskaya et. al (2014), as depicted in FIG. 1 which is incorporated by reference herein in its entirety.

In embodiments, a yttria-zirconia ceramic sintered body comprising a solid solution of a c-type cubic structure (denoted as C according to the phase diagram of FIG. 1), a fluorite structure (denoted as F according to the phase diagram of FIG. 1), and combinations thereof are disclosed herein, as depicted within the square region as defined in FIG. 1. Within this compositional range (horizontal axis) and sintering temperature region (vertical axis), embodiments of the ceramic sintered bodies may be formed. In other embodiments (dependent upon composition according to the phase diagram of FIG. 1), the ceramic sintered body comprises a solid solution of a c-type (yttria) cubic structure. The c-type, yttria/rare earth oxide crystal structure is disclosed in detail according to "Phase Equilibria in Systems Involving the Rare-Earth Oxides. Part 1. Polymorphism of the Oxides of the Trivalent Rare-Earth Ions", by R. S. Roth et. al., 1960 which is incorporated by reference herein in its entirety.

The ceramic sintered components as disclosed herein may benefit from use of the yttria-zirconia ceramic sintered bodies for a number of reasons. Yttria zirconia ceramic sintered bodies within the compositional range of from not less than 75 mol % to not more than 95 mol % $Y_2O_3$ and from not less than 5 mol % to not more than 25 mol % $ZrO_2$ may provide a preferred combination of high density (and correspondingly low porosity), halogen based plasma resistance, dielectric and thermal properties, and hardness as compared to other ceramic materials. The yttria zirconia ceramic sintered bodies and components fabricated therefrom may be formed from a range of compositions, for example from not less than 75 mol % to not more than 95 mol % $Y_2O_3$ and from not less than 5 mol % to not more than 25 mol % $ZrO_2$, preferably from not less than 75 mol % to not more than 93 mol % $Y_2O_3$ and not less than 7 mol % to not more than 25 mol % $ZrO_2$, preferably from not less than 75 mol % to not more than 90 mol % $Y_2O_3$ and not less than 10 mol % to not more than 25 mol % $ZrO_2$, preferably from not less than 75 mol % to not more than 87 mol % $Y_2O_3$ and not less than 13 mol % to not more than 25 mol % $ZrO_2$, preferably from not less than 75 mol % to not more than 85 mol % $Y_2O_3$ and from not less than 15 mol % to not more than 25 mol % $ZrO_2$, preferably from not less than 75 mol % to not more than 83 mol % $Y_2O_3$ and not less than 17 mol % to not more than 25 mol % $ZrO_2$, preferably from not less than 77 mol % to not more than 83 mol % $Y_2O_3$ and not less than 17 mol % to not more than 23 mol % $ZrO_2$, preferably from not less than 78 mol % to not more than 82 mol % $Y_2O_3$ and not less than 18 mol % to not more than 22 mol % $ZrO_2$, and more preferably from about 80 mol % $Y_2O_3$ to about 20 mol % $ZrO_2$.

In some embodiments, the c-type cubic phase may be preferable, and formed according to the phase diagram of FIG. 1 from a composition comprising not less than about 80 mol % to not greater than 95 mol % yttria and from not less than 5 mol % to not greater than 20 mol % zirconia, preferably from not less than 81 mol % to not more than 95 mol % $Y_2O_3$ and not less than 5 mol % to not more than 19 mol % $ZrO_2$, preferably from not less than 82 mol % to not more than 95 mol % $Y_2O_3$ and not less than 5 mol % to not more than 18 mol % $ZrO_2$, preferably from not less than 83 mol % to not more than 95 mol % $Y_2O_3$ and not less than 5 mol % to not more than 17 mol % $ZrO_2$, preferably from not less than 84 mol % to not more than 95 mol % $Y_2O_3$ and not less than 5 mol % to not more than 16 mol % $ZrO_2$, preferably from not less than 86 mol % to not more than 95 mol % $Y_2O_3$ and not less than 5 mol % to not more than 14 mol % $ZrO_2$, preferably from not less than 88 mol % to not more than 95 mol % $Y_2O_3$ and not less than 5 mol % to not more than 12 mol % $ZrO_2$, preferably from not less than 90 mol % to not more than 95 mol % $Y_2O_3$ and not less than 5 mol % to not more than 10 mol % $ZrO_2$, and preferably from not less than 92 mol % to not more than 95 mol % $Y_2O_3$ and not less than 5 mol % to not more than 8 mol % $ZrO_2$.

Use in semiconductor processing chambers of the ceramic sintered bodies and components prepared in accordance with the method disclosed herein provides enhanced resistance to corrosion and erosion from halogen-based process gases. This enhanced plasma resistance results at least in part from the high densities and correspondingly low porosities of the sintered bodies. Embodiments of the yttria-zirconia ceramic sintered bodies (and components fabricated therefrom) as disclosed may have densities of from 5.01 to 5.15 g/cc, preferably from 5.01 to 5.13 g/cc, preferably from 5.03 to 5.13 g/cc, preferably from 5.06 to 5.13 g/cc, preferably from 5.08 to 5.15 g/cc, preferably from 5.08 to 5.13 g/cc, preferably from 5.10 to 5.13 g/cc, preferably from 5.12 to 5.13 g/cc, preferably from 5.01 to 5.11 g/cc, preferably from 5.01 to 5.10 g/cc, preferably from 5.06 to 5.15 g/cc, preferably from 5.06 to 5.12 g/cc, and more preferably from 5.08 to 5.13 g/cc according to Archimedes density measurements performed in accordance with ASTM B962-17. Table 1 lists the conditions for preparation (temperature, time, pressure and annealing), density and volumetric porosity for yttria zirconia ceramic sintered bodies as disclosed herein.

The volumetric mixing rule as known to those skilled in the art may not be applicable to solid solutions such as the ceramic sintered bodies as disclosed, and thus may be used for approximation of theoretical densities for the ceramic sintered bodies as disclosed herein. A combination of the volumetric mixing rule and calculations based upon equation 4 for substitutional solid solutions as disclosed in "an exact density formula for substitutional solid solution alloys", J. Mater. Sci. Letters 13 (1994), by Chen and Bandeira (which was adapted for calculation of the oxide solid solution of yttria and zirconia) were used to estimate theoretical densities as used herein. Across the compositional ranges of 95 mol % yttria and 5 mol % zirconia, and 75 mol % yttria and 25 mol % zirconia, approximate theoretical density values of 5.09 g/cc and 5.15 g/cc, respectively, were calculated. Density measurements using the Archimedes method according to ASTM B962-17 were performed on exemplary 80 mol % yttria 20 mol % zirconia ceramic sintered bodies as disclosed in Table 1. Commercial grades of zirconium oxide as used herein are known to have up to and including 5% by weight of $HfO_2$ which may slightly increase densities. An average of 5 measurements were taken and a highest value of 5.13 g/cc was measured. This value corresponds well with calculated values and as such, is taken as the theoretical density for 80 mol % yttria 20 mol % zirconia ceramic sintered bodies. Sample 8 of Table 1 corresponds to a yttria zirconia ceramic sintered body comprising 90 mol % yttria and 10 mol % zirconia, having a density of 5.08 g/cc, which is taken as the theoretical density for that composition. N/A indicates the sample was not subjected to annealing.

TABLE 1

| Sample | T (° C.) | P (MPa) | t (min) | Anneal (T/t) | Density (g/cc) | % RD | Vp (%) |
|---|---|---|---|---|---|---|---|
| 1 | 1625 | 25 | 90 | 1400/8 | 5.10 | 99.4% | 0.60 |
| 2 | 1625 | 25 | 90 | N/A | 5.13 | 100.0% | ~0 |
| 3 | 1600 | 15 | 30 | N/A | 5.11 | 99.6% | 0.40 |
| 4 | 1600 | 15 | 30 | 1200/8 | 5.11 | 99.6% | 0.40 |
| 5 | 1600 | 15 | 30 | 1300/8 | 5.09 | 99.2% | 0.80 |
| 6 | 1450 | 20 | 30 | 1300/8 | 5.11 | 99.6% | 0.40 |
| 7 | 1500 | 30 | 30 | N/A | 5.13 | 100% | ~0 |
| 8* | 1500 | 30 | 30 | N/A | 5.08 | 100%* | ~0 |

The relative density (RD) for a given material is defined as the ratio of the measured density of the sample (ρsample) to the reported theoretical density (ρtheoretical) for the same material, as shown in the following equation:

$$RD = \frac{\rho \text{ sample}}{\rho \text{ theoretical}} = 1 - Vp$$

where ρ sample is the measured (Archimedes) density according to ASTM B962-17, β theoretical is the measured theoretical density as disclosed herein, and RD is the relative fractional density. Yttria-zirconia ceramic sintered bodies having high density thereby have correspondingly low porosity. Porosity (used synonymously with volumetric porosity herein) may be calculated by subtracting density of a fully dense part (i.e. 100%) from the relative density (as calculated above). Using this calculation, porosity (or volumetric porosity as the case may be) by percent of total volume of from not less than 0.05 to not greater than 2%, preferably from not less than 0.05 to not greater than 1.5%, preferably from not less than 0.05 to not greater than 1%, preferably from not less than 0.05 to not greater than 0.5%, preferably from not less than 0.1 to not greater than 1.5%, preferably from not less than 0.1 to not greater than 1%, preferably from not less than 0.1 to not greater than 0.5%, and more preferably from not less than 0.05 to not greater than 0.2% were calculated from measured Archimedes density values for the yttria-zirconia ceramic sintered bodies as disclosed herein.

The ceramic sintered body and related components fabricated therefrom as disclosed herein may have a density relative to the theoretical density (or relative density, RD) of from 98 to 100%, preferably from 98.5 to 100%, preferably from 99 to 100%, preferably from 99.5 to 100%, more preferably from 99.8 to 100% of theoretical density as calculated from density measurements performed in accordance with ASTM B962-17. The variation in density (relative to theoretical density) across a greatest dimension (in the case of disk shaped samples, the greatest dimension is the diameter) of the ceramic sintered body may be not greater than 2%, preferably not greater than 1.5%, preferably not greater than 1%, and more preferably not greater than 0.8%.

The high densities as disclosed herein contribute to high hardness values for the yttria-zirconia sintered ceramic bodies. Hardness measurements were performed in accordance with ASTM Standard C1327 using a 0.1 kgf load cell. The following Table 2 lists hardness results across about 40 total measurements for samples 1, 2 and 11, each comprising about 80 mol % yttria and about 20 mol % zirconia. Sample 11 was prepared under similar conditions of pressure, temperature and time as that of Sample 7.

TABLE 2

|  | Sample 1 | Sample 2 | Sample 11 |
|---|---|---|---|
| Average (GPa) | 10.2 | 10.3 | 11.0 |
| Minimum (GPa) | 9.1 | 9.3 | 9.9 |
| Maximum (GPa) | 11.5 | 11.8 | 13.2 |
| St Dev (GPa) | 0.4 | 0.6 | 0.7 |
| Max Range (GPa) | 1.3 | 2.3 | 3 |

Embodiments of the yttria-zirconia sintered ceramic body may have a hardness of from not less than 8.5 to 14.5 GPa. Other embodiments may have an average hardness of from not less than 9.4 to not greater than 12.4 GPa, preferably an average hardness of from not less than 9.8 to not greater than 11.7 GPa, and preferably from not less than 10.2 to not greater than 11 GPa.

The yttria-zirconia sintered ceramic body may comprise an integral body as made according to the process disclosed herein, and thus may comprise porosity uniformly distributed on a surface and throughout the body. In other words, porosity measured on a surface is representative of porosity within a volume of the bulk sintered ceramic body, and as such, the terms "porosity" and "volumetric porosity" are taken to have the same meaning as used herein.

Semiconductor processing reactors as relates to etch or deposition processes require chamber components fabricated from materials having high resistance to chemical corrosion by reactive plasmas necessary for semiconductor processing. These plasmas or process gases may be comprised of various halogen, oxygen and nitrogen-based chemistries such as $O_2$, F, $Cl_2$, HBr, $BCl_3$, $CCl_4$, $N_2$, $NF_3$, NO, $N_2O$, $C_2H_4$, $CF_4$, $SF_6$, $CAF_8$, $CHF_3$, $CH_2F_2$. Use of the ceramic sintered body formed from corrosion resistant materials as disclosed herein provides for reduced chemical corrosion during use. Additionally, providing a chamber component material such as a ceramic sintered body having a very high purity provides a uniformly corrosion resistant body low in impurities which may serve as a site for initiation of corrosion. Further, components fabricated from highly dense materials having minimal pores of small diameters may provide greater resistance to corrosion and erosion during etch and deposition processes. As a result, preferred chamber components may be those fabricated from materials having high erosion and corrosion resistance during plasma etching and deposition. The term "plasma resistance" as used herein refers to materials which do not corrode or erode during exposure to halogen based process gas plasmas. This plasma resistance prevents the release of particles from the component surfaces into the reactor chamber during semiconductor processing. Such particle release into the reactor chamber contributes to wafer contamination by introducing semiconductor process drift and semiconductor device level yield loss.

Chamber components must possess sufficient flexural or mechanical strength for handleability as required for component installation, removal, cleaning and during use within process chambers. Use of current and pressure assisted sintering techniques with high heating and cooling rates and short sintering times provides for a high density and fine grain size in the ceramic sintered body and related components, providing increased mechanical strength. High mechanical strength allows for machining intricate features of fine geometries into the ceramic sintered body without breakage, cracking or chipping. Flexural strength or rigidity becomes particularly important at large component sizes used in state-of-the-art process tools. In some component applications such as a chamber window of diameter on the order of 200 to 622 mm, significant stress is placed upon the window during use under vacuum conditions. This requirement necessitates use of corrosion resistant materials having high strength and rigidity (also referred to as the Young's modulus). The ceramic sintered bodies according to embodiments disclosed herein meet these strength and handleability requirements.

As semiconductor device geometries shrink to ever decreasing dimensions, temperature control becomes increasingly important to minimize process yield loss. This variation in temperature within the processing chamber affects control over critical dimensions of nanometer scale features, adversely affecting device yields. Material selection for chamber components having low dielectric loss, such as for example a dielectric loss of $1 \times 10^{-4}$ and less (dielectric loss is herein used synonymously with the terms "dissipation factor" and "loss tangent") may be desirable to prevent generation of heat, resulting in temperature nonuniformity within the chamber. Dielectric loss may be affected by grain size, purity and use of dopants and/or sintering aids in the material, among other factors. The use of sintering aids and/or dopants, combined with extended sintering conditions may result in larger grain size, lower purity materials which may not provide the low loss tangents necessary for application to high frequency chamber processes common in the industry, and may result in particle generation and decreased mechanical strength, hindering fabrication of large component sizes. Thus, disclosed herein is a ceramic sintered body which is free of, or substantially free of, dopants and/or sintering aids. Preferable for semiconductor chamber components are those materials which have as low dielectric loss as possible in order to improve plasma generation efficiency and prevent overheating, in particular at the high frequencies of from 1 MHz to 20 GHz (and higher into the RF range) as used in plasma processing chambers. Heat generated by absorption of microwave energy in those component materials having higher dielectric loss causes non-uniform heating and increased thermal stresses upon components. Table 3 following lists dielectric loss and dielectric constant as measured at ambient temperature at 1 MHz according to ASTM D-150 from samples 9 and 10 comprising about 80 mol % yttria and about 20 mol % zirconia made according to the method as disclosed herein. Within the scope of the measurements performed, the same dielectric performance was measured for yttria zirconia ceramic sintered bodies which were annealed and those which were not annealed.

TABLE 3

| Sample | dissipation factor | dielectric constant | T (° C.) | P (MPa) | t (min) | Anneal (T(° C.)/ t, hr) |
|---|---|---|---|---|---|---|
| 9 | 0.0001 | 12.7 | 1600 | 15 | 45 | 1400/8 |
| 10 | 0.0001 | 12.7 | 1625 | 20 | 60 | no anneal |

Embodiments of the ceramic sintered body comprising compositions of yttria and zirconia may have low levels of porosity, less than 2%, preferably less than 1%, preferably from 0.05% to 2%, preferably from 0.05% to 1%, more preferably from 0.05% to 0.5% of total area comprising porosity, which may provide improved performance in semiconductor plasma etch and deposition applications. This may result in extended component lifetimes, greater process stability and reduced chamber downtime for cleaning and maintenance. Porosity is measured (Strasbaugh polishing equipment, polishing supplies from Struers, Inc.) by image analysis of a polished surface, polished according to the following method: (i) 40 um alumina: as needed to flatten the surface; (ii) 12 um alumina, fixed abrasive pad: 2 min; (iii) 9 pm diamond, polyurethane pad: 8 min; (iv) 6 um diamond, napped cloth: 3 min and (v) 1 um diamond, napped cloth: 3 min. Images were taken at 5000× magnification using a Nanoscience Instruments Phenom XL scanning electron microscopy (SEM). The SEM images were imported into ImageJ image processing software and used to measure and quantify pore size and pore area. Disclosed herein is a nearly dense or fully dense yttria-zirconia ceramic sintered body having minimal (<2% by volume) porosity. This minimal porosity may enable reductions in particle generation by providing a highly dense plasma-facing surface, thus preventing entrapment of contaminants in the surface of the ceramic sintered body during etch and deposition processes. The corrosion resistant ceramic sintered body as disclosed herein may have a very high density relative to theoretical density, of greater than 98%, preferably greater than 99%, preferably greater than 99.5%, more preferably about 99.8%, and correspondingly low porosity below 2%, preferably below 1%, preferably below 0.5%, preferably below 0.2% on a surface and throughout a volume of the ceramic sintered body, providing improved etch resistance by way of controlled surface area comprising porosity. The ceramic sintered body as disclosed herein is an integral, homogeneous body, comprising the crystalline phases, purity and porosity/pores both on a surface and throughout. Thus, features such as crystalline phases, pore size, % porosity and pore area as measured on a surface is representative of features within the bulk, and thereby within the volume, of the sintered ceramic body. The word "homogeneous" means that a material or system has substantially the same property at every point; it is uniform without irregularities. Thus, by "homogeneous body" is meant that the distribution of features such as % porosity, pore sizes, pore areas and crystalline phases are spatially uniform and do not have considerable gradients, i.e., a substantially uniform sintered ceramic body exists regardless of position within the bulk or on a surface.

Ceramic sintered bodies comprising yttria and zirconia may be among the most etch resistant materials known, and the use of high purity starting materials to fabricate a ceramic sintered body of very high purity and density as a starting material provides plasma resistant properties in the ceramic sintered component. Impurities or contaminants present may act as sites for initiation of corrosion and/or erosion during plasma processing. This high purity may prevent roughening of the surface of the ceramic sintered body by halogen based gaseous species which may otherwise chemically attack, surface-roughen and etch those components made from powders lower in purity.

For the aforementioned reasons, a total purity of greater than 99.99%, preferably greater than 99.995% preferably greater than 99.999% relative to 100% material purity in the yttrium oxide and zirconium oxide starting materials is preferable.

Purity of the zirconium oxide starting material may be higher than 99.9%, preferably higher than 99.95%, preferably higher than 99.99%, to provide corrosion and erosion resistance during use in etch and deposition chamber conditions. Commercial grades of zirconium oxide are known to have up to and including 5% by weight of $HfO_2$. Zirconia and Hafnia ($HfO_2$) may react similarly during formation of the yttria zirconia ceramic sintered body as disclosed herein, and as such, the presence of HfO2 in the ceramic sintered body is not considered detrimental to use of the sintered bodies as chamber components in plasma processing applications. Thus, HfO2 is not considered an impurity as disclosed herein. Further, removal of Hafnia from Zirconia to amounts of ≤5% by weight may be impractical due to the resultant high costs of the zirconia powder. As such, $HfO_2$ present in the starting zirconia powder is not considered to be a contaminant or impurity and as such is not considered when reporting purity, contaminants and impurities as disclosed herein. The zirconium oxide starting powder may comprise at least one selected from the group consisting of unstabilized, partially stabilized and stabilized zirconia.

Total purity of the calcined powder mixture as disclosed herein may be higher than 99.99%, preferably higher than 99.995%, more preferably about 99.999% and higher, each relative to 100% purity of the calcined powder mixture.

Total purity of the ceramic sintered body as disclosed herein may be higher than 99.99%, preferably higher than 99.995% relative to 100% purity of the ceramic sintered body. In embodiments where zirconia media is used for mixing, the molar ratios of yttria to zirconia may be adjusted to account for wear of the media to achieve a final, desired composition and the purity of the ceramic sintered component may be retained from that of the ceramic sintered body and related starting materials.

Method of Preparing

Preparation of the ceramic sintered body may be achieved by use of pressure assisted sintering combined with direct current sintering and related techniques, which employ a direct current to heat up an electrically conductive die configuration or tool set, and thereby a material to be sintered. This manner of heating allows the application of very high heating and cooling rates, enhancing densification mechanisms over grain growth promoting diffusion mechanisms, which may facilitate preparation of ceramic sintered bodies of very fine grain size, and transferring the intrinsic properties of the original powders into their near or fully dense products.

A ceramic sintered body is prepared by a method, the method comprising the steps of: a. combining powders of yttrium oxide and zirconium oxide to make a powder mixture; b. calcining the powder mixture by applying heat to raise the temperature of the powder mixture to a calcination temperature and maintaining the calcination temperature to form a calcined powder mixture; c. disposing the calcined powder mixture inside a volume defined by a tool set of a sintering apparatus and creating vacuum conditions inside the volume; and d. applying pressure to the calcined powder mixture while heating to a sintering temperature and performing sintering to form the ceramic sintered body; and e. lowering the temperature of the ceramic sintered body. The following additional method steps are optional: f. optionally annealing the ceramic sintered body by applying heat to raise the temperature of the ceramic sintered body to reach an annealing temperature to form an annealed ceramic sintered body; and g. lowering the temperature of the annealed ceramic sintered body; and h. machining the ceramic sintered body to form a ceramic sintered body component (which may in embodiments also be annealed) such as a window, an RF window, a lid, a focus ring, a shield ring, a nozzle, a gas injector, a shower head, a gas distribution plate, a chamber liner, a chuck, a puck, and/or a cover ring in plasma processing chambers. Embodiments of a ceramic sintered body component comprising a window, an RF window, or a lid may be taken to be equivalent as disclosed herein.

The characteristics of the corrosion resistant, ceramic sintered body component formed from the ceramic sintered body are achieved in particular by adapting the purity of the starting powders of yttrium oxide and zirconium oxide as well as the purity of the powder mixture, the pressure to the calcined powder mixture (of yttrium oxide and zirconium oxide), the sintering temperature, the duration of sintering, the temperature of the ceramic sintered body/ceramic sintered body component during the optional annealing step, and the duration of the optional annealing step.

The method as disclosed herein provides for the preparation of ceramic sintered bodies and/or ceramic sintered body components across a compositional range of from not less than 75 mol % to not greater than 95 mol % yttrium oxide ($Y_2O_3$), and from not less than 5 mol % to not greater than 25 mol % zirconium oxide ($ZrO_2$).

The characteristics of the ceramic sintered body and ceramic sintered body components according to an embodiment are achieved in particular by the starting powder particle size distribution (PSD), specific surface area (SSA), purity (as measured by inductively coupled mass spectrometry, ICP-MS) and methods of the powder mixing/combining, and calcining the powder mixture, the particle size and surface area of the calcined powder mixture, the pressure to the calcined powder mixture, the sintering temperature of the powder mixture, the duration of sintering of the powder mixture, the temperature of the ceramic sintered body or component during the optional annealing step, and the duration of the optional annealing step. The process as disclosed provides for preparation of single phase cubic, c-type yttria (C), or mixed phase cubic (phases of c-type yttria and fluorite (F) crystal structures) ceramic sintered bodies comprising yttrium oxide and zirconium oxide having high purity, low volumetric porosity and high density. The ceramic sintered body is particularly suitable for use as a ceramic sintered body or corrosion-resistant member in a plasma processing apparatus such as a semiconductor manufacturing apparatus. Such parts or members may include windows, lids, nozzles, injectors, shower heads, chamber liners, wafer supports, electronic wafer chucks, and various rings as known to those skilled in the art, such as for example focus rings and protective rings.

Step a) of the method disclosed herein includes combining powders of yttrium oxide and zirconium oxide to make a powder mixture. The starting materials of yttrium oxide and zirconium oxide for forming a ceramic sintered body and/or component are preferably high purity commercially available powders. However, other oxide powders may be used, for example those produced from chemical synthesis processes and related methods. The zirconium oxide starting powder may comprise at least one selected from the group consisting of unstabilized, partially stabilized and stabilized zirconia. Yttria is known to be added as a stabilizer for zirconia, and accordingly, in some embodiments, yttria may be preferable as a zirconia stabilizer to provide a high purity, ceramic sintered body comprising Y, Zr and O as disclosed herein, although other known stabilizers of zirconia may be used.

At step a), ceramic powders of yttrium oxide and zirconium oxide are batched according to the desired molar ratios of yttria and zirconia in the ceramic sintered body. The ceramic sintered body may be formed from powder mixtures having a molar range of from not less than 75 mol % to not greater than 95 mol % yttrium oxide ($Y_2O_3$), and from not less than 5 mol % to not greater than 25 mol % zirconium oxide ($ZrO_2$). The purity of the yttria powder may be greater than 99.9%, preferably greater than 99.99%, preferably greater than 99.999%, preferably about 99.9999%, and the purity of the zirconia powder may be greater than 99.95%, preferably greater than 99.99%, preferably greater than 99.995% as measured by inductively coupled mass spectrometry, ICP-MS using an Agilent 7900 ICP-MS model G8403. Reporting limits to detect presence of lighter elements, such as from Sc and lighter, using ICPMS as disclosed herein are in general higher, about 1.4 ppm and less, than reporting limits of heavier elements which may be about 0.14 ppm and less. In particular, use of ICPMS methods as disclosed herein to detect Si may be done within a confidence of about 14 ppm and greater. As such, the starting powders, powder mixtures, calcined powder mixtures and sintered ceramic bodies may comprise silica in an amount of about 14 ppm or less. Si in the form of silica is not included in the % purity or impurity contents of the starting powders, calcined powder mixtures and sintered ceramic bodies as disclosed herein and may be taken to be about 14 ppm and less, although Si was undetected in many instances.

Table 4 lists impurities/contaminants (in ppm) and % purity (relative to 100% purity) as measured using ICP-MS for exemplary 80 mol % yttria/20 mol % zirconia calcined powder mixtures 1 to 7 made from mixtures of the disclosed yttria and zirconia starting materials (Hf is not included in the results as an impurity for the reasons disclosed herein, and silica may be detectable in amounts of 14 ppm and less, although silica was usually not detected).

The zirconium oxide starting material typically comprises zirconium, HfO2 and impurities. In an embodiment, the starting material may comprise more than 94 wt % zirconium oxide, less than 5 wt % HfO2, and less than 0.1 wt % impurities, or more than 96 wt % zirconium oxide, less than 3 wt % HfO2 and less than 0.05 wt % impurities. Impurities. In a further embodiment, with the exception of impurities, the zirconium oxide starting material consists of more than 94 wt % zirconium oxide, less than 5 wt % HfO2, or more than 96 wt-% zirconium oxide, less than 3 wt-% $HfO_2$, wherein the total amount of impurities is less than 0.1 wt %, preferably less than 0.05 wt %, and more preferably less than 0.02 wt %.

Impurities typically may comprise metal elements, such as Al, B, Ca, Cr, Co, Cu, Fe, Pb, Li, Mg, Mn, Ni, K, Na, Sn, and Zn, and their respective metal oxides.

TABLE 4

| powder | ppm | % purity |
| --- | --- | --- |
| 1 | 6 | 99.9994 |
| 2 | 27 | 99.997 |
| 3 | 20 | 99.998 |
| 4 | 40 | 99.996 |
| 5 | 9 | 99.9991 |
| 6 | 28 | 99.9972 |
| 7 | 18.5 | 99.9982 |

Specific surface area for the starting powders, powder mixtures and calcined powder mixtures was measured using a Horiba BET Surface Area Analyzer model SA-9601 capable of measuring across a specific surface area of 0.01 to 2000 $m^2/g$ with an accuracy of 10% and less for most samples. Particle sizes for the starting powders, powder mixtures and calcined powder mixtures were measured using a Horiba model LA-960 Laser Scattering Particle Size Distribution Analyzer capable of measuring particle size from 10 nm to 5 mm. The d50 as used herein is defined as the median and represents the value where half of the particle size distribution resides above this point, and half resides below this point. Similarly, 90 percent of the distribution lies below the d90, and 10 percent of the distribution lies below the d10.

The typical surface area of the yttrium oxide powder may be from 1 to 15 m$^2$/g, preferably from 2 to 10 m$^2$/g, preferably from 2 to 8 m$^2$/g, preferably from 2 to 6 m$^2$/g, preferably from 3 to 10 m$^2$/g, preferably from 4 to 10 m$^2$/g, preferably from 6 to 10 m$^2$/g, preferably from 2 to 4 m$^2$/g.

The d10 particle size of the yttrium oxide powder used as a starting material according to embodiments as disclosed herein is preferably from 1 to 6 µm, preferably from 1 to 5 µm, preferably from 1 to 4 µm, preferably from 2 to 6 µm, preferably from 3 to 6 µm, preferably from 4 to 6 µm, preferably from 2 to 4 µm.

The d50 particle size of the yttrium oxide powder used as a starting material according to embodiments as disclosed herein is preferably from 3 to 9 µm, preferably from 3 to 8.5 µm, preferably from 3 to 8 µm, preferably from 3 to 7 µm, preferably from 4 to 9 µm, preferably from 5 to 9 µm, preferably from 6 to 9 µm, preferably from 4 to 8 µm. The yttria powder as disclosed herein may have an average particle size of from about 5 to 9 µm.

The d90 particle size of the yttrium oxide powder used as a starting material according to embodiments as disclosed herein is preferably from 6 to 16 um, preferably from 6 to 15 um, preferably from 6 to 14 um, preferably from 6.5 to 16 um, preferably from 7 to 16 um, preferably from 7.5 to 16 um, preferably from 7.5 to 14 um.

The purity of the yttrium oxide starting material is preferably higher than 99.99%, preferably higher than 99.995%, preferably higher than 99.999%, more preferably higher than 99.9995%, and more preferably about 99.9999%. This corresponds to impurity levels of 100 ppm and less, preferably 50 ppm and less, preferably 25 ppm and less, preferably 10 ppm and less, more preferably about 1 ppm, preferably from 1 to 100 ppm, preferably from 1 to 50 ppm, preferably from 1 to 25 ppm, preferably from 1 to 10 ppm, preferably from 1 to 5 ppm.

Zirconia as used herein typically comprises Hf in the form of HfO2 in amounts of from about 2 to 5 mol %, and up to as much as 5 weight % as is common in many commercially available zirconia powders. Hf, owing to its chemically similar behavior to Zirconia, is not considered an impurity as disclosed herein, and thus not included in purity/impurity amounts. The zirconia powder typically has a specific surface area of from 1 to 16 m2/g, preferably from 2 to 12 m2/g, and more preferably from 4 to 9 m2/g. The purity of the zirconia starting powder is typically higher than 99.5%, preferably higher than 99.8%, preferably higher than 99.9%, preferably higher than 99.99%, more preferably higher than 99.995%, relative to 100% purity. This corresponds to a total impurity content of 5000 pm and less, preferably 2000 ppm and less, preferably 1000 ppm and less, preferably 100 ppm and less, and more preferably 50 ppm and less.

The zirconium oxide powder may have a particle size distribution having a d10 of from 0.08 to 0.50 um, a d50 of from 0.5 um to 0.9 um and a d90 of from 0.9 to 5 um.

The starting powders as disclosed herein of zirconia and yttria are preferably crystalline, and thereby have a long-range crystallographic order. Starting powders having high surface areas such as those exceeding 20 m2/g pose issues in handleability. Thus, it is preferable that the powder mixtures and/or calcined powder mixtures as disclosed herein are free of, or substantially free of nanopowders, and have a specific surface area (SSA) of about 18 m2/g and less.

Starting powders having specific surface area of less than about 1 m2/g may suffer from agglomeration and require higher energy for mixing and extended mixing times and may reduce the sintering activation energy, thus producing ceramic sintered bodies having lower densities and higher porosity. Preferable for use in the method as disclosed are starting powders as disclosed herein having a SSA of typically from 1 to 18 m$^2$/g, preferably from 2 to 15 m$^2$/g.

In accordance with step a), the selected ceramic powders of yttria and zirconia may be combined using the powder preparation techniques of wet or dry ball (axially rotating) milling, wet or dry tumble (end over end or vertical) mixing, jet milling, and combinations of these as known to those skilled in the art. Use of these powder combination methods provide a high energy process which breaks down particulates and agglomerates.

Using dry conditions, the starting powders may be ball milled or end-over-end/tumble mixed using high purity (>99.9%) alumina media. In other embodiments, zirconia media may be used to break up hard agglomerates. Ball milling may be accomplished using zirconia media as one example and conducted according to methods as known to those skilled in the art. In embodiments where zirconia media is used for mixing, the molar ratios of yttria to zirconia may be adjusted to account for wear of the media to achieve a final, desired composition and the purity of the ceramic sintered component may be very close to or retained from that of the ceramic sintered body and related starting materials. In other instances, aluminum oxide media may be used. In embodiments where alumina media is used for mixing, alumina may be present in trace amounts in the ceramic sintered body. Media used to perform dry ball milling may have a range of dimensions, from for example 5 to 15 mm in diameter, added at a loading of from about 50 to about 100% by powder weight. Media used to perform dry tumble mixing may comprise at least one media element of large dimension (from about 20 to 40 mm diameter) without limitation. Dry ball milling and/or dry tumble mixing may be performed for durations of from 12 to 48 hours, preferably from 16 to 48 hours, preferably from 16 to 24 hours, preferably from 18 to 22 hours. Dry ball milling or tumble milling processes (axially rotating) may use an RPM of from 50 to 250 RPM, preferably from 75 to 200 RPM, preferably from 75 to 150 RPM, preferably from 100 to 125 RPM, each for containers having about 200 mm diameter. RPMs may vary dependent upon the dimensions of containers selected for use, and as such, those containers greater than 200 mm in diameter may have correspondingly lower RPMs as known to those skilled in the art. Dry end-over-end/tumble mixing may be performed at an RPM of from 10 to 30 rpm, preferably about 20 RPM. After dry ball milling and/or end-over-end/tumble milling/mixing, the powder mixture may be optionally sieved using any number of meshes which may have openings of for example from 45 to 400 um, and blended, without limitation as to repetition or order as known to those skilled in the art.

Wet ball milling or wet end-over-end/tumble mixing may be performed by suspending the starting powders in various solvents such as ethanol, methanol, and other alcohols, to form a slurry. The slurries in either process may be formed having a powder loading during milling or mixing of from 25 to 75% by powder weight, preferably from 40 to 75% by powder weight, preferably from 50 to 75% by powder weight. Wet ball milling or wet end-over-end/tumble mixing may provide for improved dispersion of the powders through increased mobility, resulting in fine scale, uniform mixing before heat treatment or calcination. In other embodiments, wet mixing may be conducted using between 25 and 50% by powder weight of liquids such as water, ethanol, isopropanol and between 25 to 150% by powder weight of media may be added to the powder mixture to form a slurry. The wet milling processes may be performed for the same duration and RPM as disclosed for the dry processes.

Where wet mixing or milling processes are used, the slurry may be dried by rotary evaporation methods for example at a temperature of from about 40° C. to 90° C. for a duration of from 1 to 4 hours, dependent upon the volume of slurry to be dried, as known to those skilled in the art. In other embodiments, the slurry may be dried using spray drying techniques as known to those skilled in the art. After drying, the powder mixture may be optionally sieved using a mesh having openings of for example from 45 to 400 um, and blended, without limitation as to repetition or order. The aforementioned powder preparation techniques may be used alone or in any combination thereof.

After drying, the powder mixture of step a) may have a specific surface area (SSA) of from 2 to 18 $m^2/g$, preferably from 2 to 17 $m^2/g$, preferably from 2 to 14 $m^2/g$, preferably from 2 to 12 $m^2/g$, preferably from 2 to 10 $m^2/g$, preferably from 4 to 17 $m^2/g$, preferably from 6 to 17 $m^2/g$, preferably from 8 to 17 $m^2/g$, preferably from 10 to 17 $m^2/g$, preferably from 4 to 12 $m^2/g$, preferably from 4 to 10 $m^2/g$, and preferably from 5 to 8 $m^2/g$.

The purity of the powder mixtures may be maintained after mixing/milling from that of the starting materials through the use of milling media of high purity, for example aluminum oxide media, of purity 99.99% and greater.

The additional powder preparation procedures of attrition milling, high shear mixing, planetary milling, and other known procedures may also be applied. The aforementioned powder preparation techniques may be used alone or in any combination thereof, or upon more than one powder mixture which are thereafter combined into a final, ceramic sintered body.

Step b) of the method disclosed herein includes calcining the powder mixture by applying heat to raise the temperature of the powder mixture to a calcination temperature and maintaining the calcination temperature to perform calcination to form calcined powder mixture. This step may be conducted such that moisture may be removed and surface condition of the powder mixture is uniform and homogeneous prior to sintering. Calcination in accordance with the heat treatment step may be performed at temperatures of from 600° C. to 1200° C., preferably from 600 to 1100° C., preferably from 600 to 1000° C., preferably from 600 to 900° C., preferably from 700 to 1100° C., preferably from 800 to 1100° C., preferably from 800 to 1000° C., and preferably from 850 to 950° C. Calcination may be performed for durations of from 4 to 12 hours, preferably from 4 to 10 hours, preferably from 4 to 8 hours, preferably from 6 to 12 hours, preferably from 4 to 6 hours in an oxygen containing environment. After calcination, the powder mixtures may be sieved and/or tumbled and/or blended according to known methods to form at least the first and second calcined powder mixtures. Calcination may or may not result in a reduction in specific surface area.

The calcined powder mixture typically has a d10 particle size of from 0.1 to 4 um, a d50 particle size of from 4 to 8 um, and a d90 particle size of from 8 to 12 um.

The calcined powder mixture typically has a specific surface area (SSA) of from 2 to 14 m2/g, preferably from 2 to 12 $m^2/g$, preferably from 2 to 10 m2/g, preferably from 2 to 8 m2/g, preferably from 2 to 6 m2/g, preferably from 2.5 to 10 m2/g, preferably from 3 to 10 m2/g, preferably from 4 to 10 m2/g, and more preferably from 2 to 6 m2/g as measured according to ASTM C1274.

The calcined powder mixture typically has a purity of from 99.99% to 99.9995%, preferably from 99.9925% to 99.9995%, preferably from 99.995% to 99.9995%, preferably from 99.995% to 99.999%, each relative to 100% purity, and an impurity content (ppm) of from 5 ppm to 100 ppm, preferably from 75 ppm to 5 ppm, preferably from 50 ppm to 5 ppm, preferably from 10 ppm to 50 ppm, as measured using ICPMS methods. Impurity contents as disclosed herein do not include Hf in the form of $HfO_2$ and Si in the form of silicon dioxide, SiO2. Using the ICPMS methods as disclosed, silica may be detected in amounts of about 14 ppm and less. Silica was not detected in the calcined powder mixtures, and thus silica may be present in an amount of about 14 ppm and less.

In addition to the aforementioned powder combination processes, jet milling processes as known to those skilled in the art may also be used to thoroughly mix the starting powders and/or the calcined powder mixture, providing a powder or powder mixture having a narrow particle size distribution. Jet milling uses high velocity jets of either inert gases or air to collide particles of the starting powders and/or powder mixtures and/or calcined powder mixtures without the use of milling or mixing media, thus preserving initial purity of the powder to be milled. The chamber may be designed such that larger particles may be preferentially reduced in size, which may provide a narrow particle size distribution in the final powders, powder mixture or calcined powder mixture. Powders exit the jet milling chamber upon reaching a desired particle size as determined at setup of the machine prior to processing. Starting powders, powder mixtures and/or calcined powder mixtures as disclosed herein may be subjected to jet milling at pressures of about 100 psi, whether separately, or in combination with any, or all of, the as disclosed powder milling/mixing processes as disclosed herein. After jet milling, the powders and/or powder mixtures may be optionally sieved using any number of meshes which may have openings of for example from 45 to 400 um, and blended, without limitation as to repetition or order. Any of the starting powders, the powder mixture, and/or the calcined powder mixture may be optionally sieved using any number of meshes which may have openings of for example from 45 um to 400 um, blended and/or dry milled at various process steps according to known methods without limitation as to repetition or order.

Step c) of the method disclosed herein includes disposing the calcined powder mixture inside a volume defined by a tool set of a sintering apparatus and creating vacuum conditions inside the volume. A sintering apparatus used in the process according to an embodiment comprises a tool set comprising at least a graphite die which is usually a cylindrical graphite die having a volume, an inner wall, and first and second openings, further comprising first and second punches. The first and second punches are operably coupled with the die, wherein each of the first and second punches have an outer wall defining a diameter that is less than a diameter of the inner wall of the die thereby creating a gap between each of the first and second punches and the inner wall of the die when at least one of the first and second punches moves within the volume of the die. The tool set as disclosed herein has a gap of from not less than 10 to not greater than 100 um, wherein the gap is configured between the inner wall of the die and the outer wall of each of the first and second punches, as disclosed in U.S. Provisional Patent Application No. 63/124,547 which is herein incorporated by reference in its entirety. An SPS apparatus and procedures are disclosed in, for example, U.S. Patent Application Publication No. 2010/0156008 A1, which is herein incorporated by reference. The first of the punches is moved within the first opening of the die, and the calcined powder mixture is disposed within the second opening of the die, and the second punch is moved within the second opening of the die, thereby disposing the calcined powder mixture inside the volume defined by the tool set of the sintering apparatus. Vacuum conditions as known to those skilled in the art are established inside the volume defined by the tool set. Typical vacuum conditions include pressures of 10-2 to 10-3 torr and less. The vacuum is applied primarily to remove air to protect the graphite from burning and to remove a majority of the air from the calcined powder mixture. The method as disclosed herein provides a process for production of ceramic sintered bodies and/or sintered ceramic components which is scalable and compatible with commercial manufacturing methods. The method utilizes powders having micron-sized average particle size distributions which are commercially available powders and/or prepared from chemical synthesis techniques, without the need for sintering aids, cold pressing, forming or machining a green body prior to sintering.

The method as disclosed utilizes commercially available powders or those prepared from chemical synthesis techniques, without the need for polymeric additives such as binders or deflocculants, sintering aids, cold pressing, forming or machining a green body prior to sintering.

Step d) of the method as disclosed herein includes applying pressure to the calcined powder mixture while heating to a sintering temperature and performing sintering to form the ceramic sintered body, and step e) includes lowering the temperature of the ceramic sintered body by removing the heat source to the sintering apparatus to cool the ceramic sintered body. After the calcined powder mixture is disposed inside the volume defined by the tool set, pressure is applied to the powder mixture. Thereby, the pressure is increased to a pressure of from 5 MPa to 60 MPa, preferably from 5 MPa to 40 MPa, preferably from 5 MPa to 30 MPa, preferably from 5 MPa to 20 MPa, preferably from 5 MPa to 10 MPa, preferably from 10 MPa to 60 MPa, preferably from 10 MPa to 40 MPa, preferably from 10 MPa to 30 MPa, preferably from 10 MPa to 20 MPa, preferably from 15 MPa to 60 MPa preferably from 15 MPa to 40 MPa, preferably from 15 MPa to 30 MPa, preferably from 15 MPa to 25 MPa, preferably from 15 to 20 MPa. The pressure is applied axially on the calcined powder mixture disposed inside the volume defined by the tool set of the sintering apparatus.

In preferred embodiments, the powder mixture is heated directly by the punches and die of the sintering apparatus. The die may be comprised of an electrically conductive material such as graphite, which facilitates resistive/joule heating. The sintering apparatus and procedures are disclosed in US 2010/0156008 A1, which is incorporated herein by reference.

Sintering the calcined powder mixture (comprising yttria and alumina) under pressure creates a co-compacted, unitary sintered ceramic body. In accordance with the method as disclosed, the calcined powder mixture is sintered in-situ to form the sintered ceramic body comprising compositions of yttria and zirconia as disclosed herein.

The temperature of the sintering apparatus according to the present disclosure is measured usually within the graphite die of the apparatus. Thereby, it is preferred that the temperature is measured as close as possible to the calcined powder mixture being processed so that the indicated temperatures are indeed realized within the calcined powder mixture to be sintered.

The application of heat to the powder mixture provided in the die facilitates sintering temperatures from about 1200 to about 1700° C., preferably from about 1200 to about 1650° C., preferably from about 1200 to about 1625° C., preferably from about 1300 to about 1700° C., preferably from about 1400 to about 1700° C., preferably from about 1500 to about 1700° C., preferably from about 1400 to about 1650° C., preferably from about 1500 to 1650° C., preferably from about 1550 to 1650° C., and more preferably from about 1600 to 1650° C.

Sintering may typically be achieved with a sintering time of from 0.5 to 180 minutes, preferably from 0.5 to 120 minutes, preferably from 0.5 to 100 minutes, preferably from 0.5 to 80 minutes, preferably from 0.5 to 60 minutes, preferably from 0.5 to 40 minutes, preferably from 0.5 to 20 minutes, preferably from 5 to 120 minutes, preferably from 10 to 120 minutes preferably from 20 to 120 minutes preferably from 40 to 120 minutes preferably from 60 to 120 minutes, preferably from 30 to 120 minutes, preferably from 30 to 90 minutes. In certain embodiments, sintering may be achieved with a sintering time of zero and upon reaching the sintering temperature, a cooling rate as disclosed herein is initiated. In process step e), the sintered ceramic body is passively cooled by removal of the heat source. Natural convection may occur until a temperature is reached which may facilitate handling of the sintered ceramic body and initiation of the optional annealing process.

During sintering, a volume reduction typically occurs such that the ceramic sintered body may comprise a volume that is about one third that of the volume of the starting powder mixture when disposed in the tool set of the sintering apparatus.

The order of application of pressure and temperature in one embodiment may vary according to the present disclosure, which means that it is possible to apply at first the indicated pressure and thereafter to apply heat to achieve the desired temperature. Moreover, in other embodiments it is also possible to apply at first the indicated heat to achieve the desired temperature and thereafter the indicated pressure. In a third embodiment according to the present disclosure, the temperature and the pressure may be applied simultaneously or intermittently to the powder mixture to be sintered and raised until the indicated values are reached.

Inductive or radiant heating methods may also be used for heating the sintering apparatus and indirectly heating the powder mixture in the tool set.

In contrast to other sintering techniques, preparation of the sample prior to sintering, i.e., by cold pressing or forming a green body before sintering (pre-formed body) is not necessary, and the calcined powder mixture is filled directly in the mold. This method of preparation will provide for high purity in the final, ceramic sintered body by avoiding contamination associated with formation and handling of a green body, laminates or tapes prior to sintering as is commonly associated with other methods.

In further contrast to other sintering techniques, sintering aids are not required. A high purity starting powder is desirable for optimal plasma resistant performance. The lack of sintering aids and the use of high purity starting materials, from between 99.99% to about 99.9999% purity, enables the fabrication of a high purity, ceramic sintered body which provides improved plasma resistance for use as a ceramic sintered component in semiconductor etch and deposition chambers. The ceramic sintered body may have purities of 99.99% and greater, preferably 99.995% and greater, more preferably 99.999% each with respect to 100% purity. These purities as reported do not include silica in the form of SiO2, or Hf in the form of $HfO_2$. Silicon dioxide ($SiO_2$) may be measured using the ICPMS methods as disclosed to as low as 14 ppm, and Hafnium oxide ($HfO_2$) is not detrimental to use within plasma processing chambers, and as such not considered an impurity or contaminant.

In one embodiment of the present invention, process step d) may further comprise a pre-sintering step with at least one heating ramp of from 0.1° C./min to 100° C./min, from 0.1° C./min to 50° C./min, from 0.1° C./min to 25° C./min, preferably from 0.5° C./min to 50° C./min, preferably from 0.5 to 25° C./min, preferably from 0.5 to 10° C./min, preferably from 0.5° C./min to 5° C./min, preferably from 1 to 10° C./min, preferably from 1 to 5° C./min, preferably from 2 to 5° C./min until a specific pre-sintering time is reached.

In a further embodiment of the present invention, process step d) may further comprise a pre-sintering step with at least one pressure ramp of from 0.15 to 30 MPa/min, from 0.15 to 20 MPa/min, from 0.15 to 10 MPa/min, from 0.15 to 5 MPa/min, from 0.25 to 20 MPa/min, from 0.35 MPa/min to 20 MPa/min, from 0.5 MPa/min to 20 MPa/min, from 0.75 MPa/min to 20 MPa/min, from 1 MPa/min to 20 MPa/min, from 5 MPa/min to 20 MPa/min, preferably from 0.15 to 5 MPa/min, preferably from 0.15 to 1 MPa/min, preferably from 0.15 to 0.5 MPa/min until a specific pre-sintering time is reached.

In another embodiment, process step d) may further comprise a pre-sintering step with the above-mentioned specific heating ramp and with the above-mentioned specific pressure ramp.

At the end of process step d), in an embodiment, the method may further comprise step e), lowering the temperature of the ceramic sintered body by removing the heat source cooling of the ceramic sintered body, which may be performed in accordance with a natural cooling of the process chamber (unforced cooling) under vacuum conditions as known to those skilled in the art. In a further embodiment in accordance with process step e), the ceramic sintered body may be cooled under convection with inert gas, for example, at 1 bar of argon or nitrogen or any inert gas. Other gas pressures of greater than or less than 1 bar may also be used. In a further embodiment, the ceramic sintered body is cooled under forced convective conditions in an oxygen containing environment. To initiate the cooling step, the power applied to the sintering apparatus is removed and the pressure applied to the ceramic sintered body is removed at the end of the sintering step d) and thereafter cooling occurs in accordance with step e).

Step f) of the method disclosed herein includes optionally annealing the ceramic sintered body (or in embodiments optionally annealing the sintered ceramic component) by applying heat to raise the temperature of the ceramic sintered body to reach an annealing temperature, performing annealing, and step g) includes lowering the temperature of the annealed ceramic sintered body. In optional step f), the resulting ceramic sintered body or ceramic sintered component of steps d) or h) respectively may be subjected to an annealing procedure (annealing may also be referred to herein as "thermal oxidation" and the terms are taken to have the same meaning). Annealing is typically performed in an oxygen containing environment such as air or forced convection. In other instances, annealing may not be performed on the ceramic sintered body or component. According to other embodiments, annealing may be performed upon removal from the sintering apparatus in an external furnace, or within the sintering apparatus itself, without removal.

For the purpose of annealing in accordance with preferred embodiments of the disclosure, the ceramic sintered body may be removed from the sintering apparatus after cooling in accordance with process step e), and the process step of annealing may be conducted in a separate apparatus such as a furnace.

In some embodiments, for the purpose of annealing in accordance with this disclosure, the ceramic sintered body in step d) may subsequently be annealed while inside the sintering apparatus, without the requirement of removal from the sintering apparatus between the sintering step d and optional annealing step f).

This annealing leads to a refinement of the chemical and physical properties of the sintered body. The step of annealing can be performed by conventional methods used for the annealing of glass, ceramics and metals, and the degree of refinement can be selected by the choice of annealing temperature and the duration of time that annealing is allowed to continue.

In embodiments, the optional step f) of annealing the sintered ceramic body is carried out at a heating rate of from 0.5° C./min to 20° C./min, preferably from 0.5° C./min to 25° C./min, more preferably from 0.5° C./min to 10° C./min, and more preferably from 0.5° C./min to 5° C./min, more preferably from 1° C./min to 50° C./min, more preferably from 3° C./min to 50° C./min, more preferably from 5° C./min to 50° C./min, more preferably from 25° C./min to 50° C./min, preferably from 1° C./min to 10° C./min, preferably from 2° C./min to 10° C./min, preferably from 2° C./min to 5° C./min.

In embodiments, the optional step f) of annealing the sintered ceramic body is carried out at a temperature of from about 900 to about 1600° C., preferably from about 1100 to about 1600° C., preferably from about 1300 to about 1600° C., preferably from about 900 to about 1500° C. preferably from about 900 to about 1400° C. preferably from about 1400 to about 1600° C.

In embodiments, the optional step f) of annealing the sintered ceramic body is carried out at a cooling rate of from 0.5° C./min to 20° C./min, preferably from 0.5° C./min to 25° C./min, more preferably from 0.5° C./min to 10° C./min, and more preferably from 0.5° C./min to 5° C./min, more preferably from 1° C./min to 50° C./min, more preferably from 3° C./min to 50° C./min, more preferably from 5° C./min to 50° C./min, more preferably from 25° C./min to 50° C./min, preferably from 1° C./min to 10° C./min, preferably from 2° C./min to 10° C./min, preferably from 2° C./min to 5° C./min.

The optional annealing step f) is intended to correct oxygen vacancies in the crystal structure and return the ceramic sintered body back to the stoichiometric ratio (the current and pressure assisted method as disclosed may produce a ceramic sintered body which is typically reduced, and oxygen deficient). The optional annealing step may be carried out at the annealing temperature for a duration of from 1 to 24 hours, preferably from 1 to 18 hours, preferably from 1 to 16 hours, preferably from 1 to 8 hours, preferably from 4 to 24 hours, preferably from 8 to 24 hours, preferably from 12 to 24 hours, preferably from 4 to 12 hours, and preferably from 6 to 10 hours.

Usually, the optional process step f) of annealing the ceramic sintered body is carried out in an oxidizing atmosphere, whereby the annealing process may provide increased albedo, lowered stress providing improved mechanical handling and reduced porosity. The optional annealing step may in embodiments be carried out in oxidizing environments such as air or forced convection.

After the optional process step f) of annealing the ceramic sintered body is performed, the temperature of the sintered, and in some instances, annealed ceramic sintered body is decreased to an ambient temperature (ambient as used herein means temperatures of from about 22° C. to about 25° C.) in accordance with process step g), and the sintered and optionally annealed ceramic body is taken out of either the furnace (in the instance that the annealing step is performed external to the sintering apparatus), or removed from the tool set (in case the annealing step f is carried out in the sintering apparatus).

The pressure and current assisted process according to one embodiment and described above is suitable for use in the preparation of large yttria-zirconia ceramic sintered bodies. The process as disclosed provides for rapid powder consolidation and densification, retaining a maximum grain size of less than 8 um in the sintered ceramic body, and achieving high densities in excess of 98% of theoretical, and volumetric porosities of less than 2%. The high density (>98%) coupled with fine grain size (<8 um) will improve handleability and reduce overall stress in the sintered ceramic body. This combination of fine grain size and high density provides for a high strength sintered yttria-zirconia ceramic sintered body of large dimension suitable for machining, handling and use as a component in a semiconductor processing chamber.

Step h) of the method disclosed herein includes optionally machining the ceramic sintered body, or in some embodiments, machining the ceramic sintered body after an optional annealing process, to form a ceramic sintered component such as a window, an RF window, a lid, a focus ring, a shield ring, a nozzle, a gas injector, a shower head, a gas distribution plate, a chamber liner, an electrostatic chuck, a puck, and/or a cover ring in plasma processing chambers, and may be carried out according to known methods for machining of corrosion resistant, ceramic components from the ceramic sintered bodies as disclosed herein. Corrosion resistant ceramic sintered components as required for semiconductor etch and deposition chambers may include RF or dielectric windows, nozzles and/or injectors, shower heads, gas distribution assemblies, chamber liners, wafer supports, electronic wafer chucks, and various rings such as focus rings, process rings, shield or protective rings, among other components as known to those skilled in the art. Machining, drilling, boring, grinding, lapping, polishing, and the like as known to those skilled in the art may be performed as necessary according to known methods to form the multilayer sintered ceramic body into a predetermined shape of a yttria zirconia ceramic sintered component for use in plasma processing chambers. The at least one surface of the ceramic sintered body may be polished (Strasbaugh polishing equipment) by the following method (polishing supplies provided by Struers, Inc.): (i) 40 um alumina: as needed to flatten the surface; (ii) 12 um alumina, fixed abrasive pad: 2 min; (iii) 9 pm diamond, polyurethane pad: 8 min; (iv) 6 um diamond, napped cloth: 3 min and (v) 1 um diamond, napped cloth: 3 min. More specifically, at least one surfaces which are configured facing the interior of the reactor chamber may be polished according to the method as disclosed to a very low surface roughness.

The surface roughness of the sintered ceramic body as disclosed herein may be correlated to particulate generation in processing chambers. Thus, it is beneficial generally to have a reduced surface roughness. Surface roughness measurements were performed using a Keyence 3D laser scanning confocal digital microscope model VK-X250X The ISO 25178 Surface Texture (Areal Roughness Measurement) is a collection of international standards relating to the analysis of surface roughness with which this microscope is compliant.

The surface of the sample was laser scanned using the confocal microscope at 50× magnification to capture a detailed image of the sample. The parameters of Sa (arithmetical mean height) and Sz (maximum height/peak to valley) were measured on the sintered ceramic body. Sa represents an average roughness value calculated across a user-defined area of a surface of the sintered ceramic body. Sz represents the maximum peak-to-valley distance across a user-defined area of a surface of the sintered ceramic body. Ra is defined as the arithmetic average of the absolute values of profile height deviations from a mean line, recorded within the measurement length. Ra measurements were taken in accordance with ASME B46.1, and values of from 20 to 45 nm were obtained across a polished surface of a ceramic sintered body having a diameter of 572 mm.

The surface roughness features of Sa, Ra and Sz are well-known parameters in the underlying technical field and, for example, described in ISO standard 25178-2-2012.

The present disclosure relates to a sintered ceramic body and/or component made therefrom having a corrosion resistant, polished surface providing an arithmetical mean height, Sa, of less than 90 nm, more preferably less than 70 nm, more preferably less than 50 nm, more preferably less than 25 nm, and preferably less than 15 nm, as measured according to ISO standard 25178-2-2012.

The present disclosure relates to a sintered ceramic body and/or component made therefrom having a corrosion resistant, polished surface providing a peak to valley height, Sz, of less than 3.5 um, preferably less than 2.5 um, preferably less than 2 um, preferably less than 1.5 um, and more preferably less than 1 um, as measured according to ISO standard 25178-2-2012.

The ceramic sintered body/component made in accordance with the method as disclosed herein may have mechanical properties sufficient to allow fabrication of a large body size for use in plasma processing chambers. The components as disclosed herein may have a size of from 100 mm to 622 mm, preferably from 100 to 575 mm, preferably from 100 to 406 mm, preferably from 150 to 622 mm, preferably from 200 mm to 622 mm, preferably from 300 to 622 mm, preferably from 150 to 575 mm, preferably from 150 to 406 mm, preferably from 406 to 622 mm, preferably from 500 to 622 mm, and more preferably from 406 to 575 mm, preferably from 450 to 622 mm, each with regard to the longest extension of the sintered body. Typically, the yttria zirconia ceramic sintered bodies as disclosed herein have a disk shape, and the longest extension is a diameter.

The method as disclosed herein provides for high purity, an improved control over the amount of porosity, higher density, improved mechanical strength and thereby handleability of the corrosion resistant, ceramic sintered component in particular for those ceramic bodies of dimensions greater than, for example, 200 mm across a longest extension, and the reduction of oxygen vacancies in the lattice of the corrosion resistant ceramic sintered component. Formation of the sintered bodies directly from the calcined powder mixtures without the need for sintering aids provides a yttria zirconia ceramic sintered body which is free of, or substantially free of, sintering aids as disclosed herein.

Performance

Figure 2:
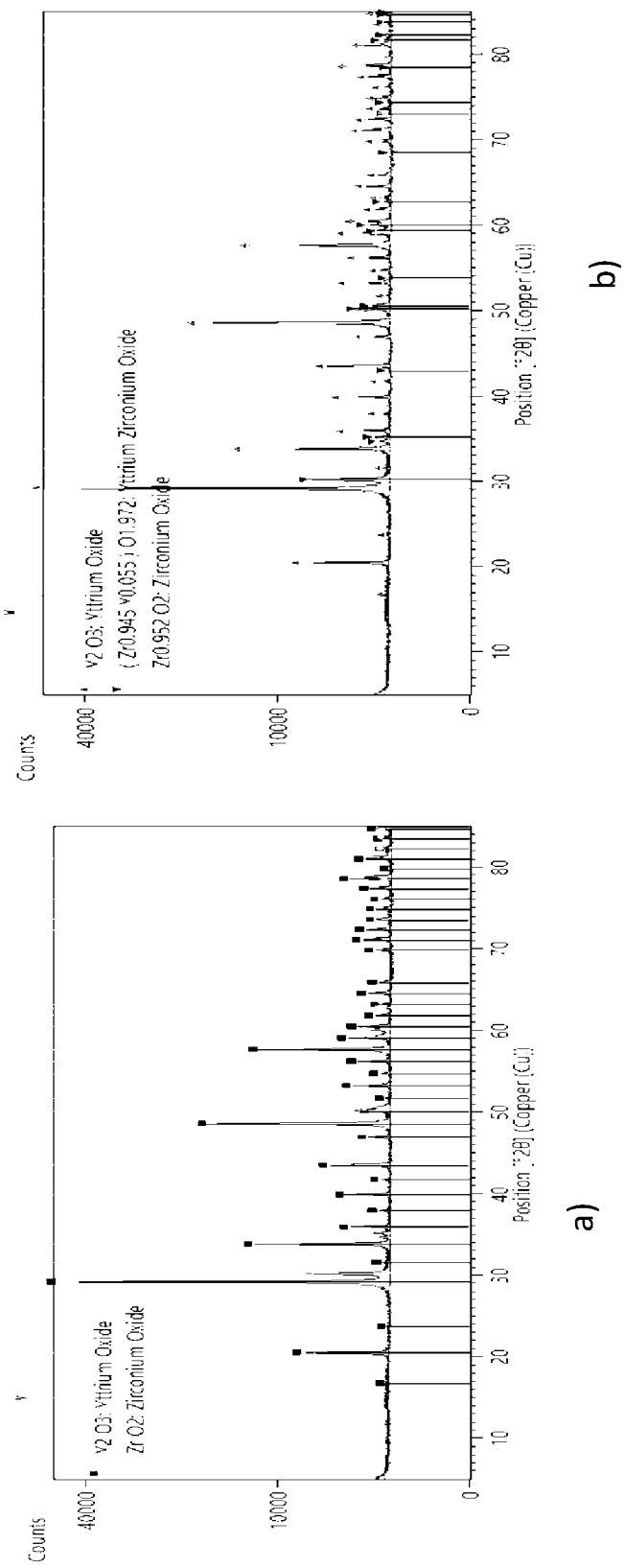
FIGS. 2 *a*) and *b*) illustrate x ray diffraction results for exemplary calcined powder mixtures as disclosed herein.

FIG. 2 depicts x ray diffraction results from powder calcination studies of exemplary yttria-zirconia calcined powder mixtures for powder batch compositions of 80 mol % yttria and 20 mol % zirconia. The exemplary powder mixture of FIG. 2 a) was calcined from 800° C. to 850° C. for from 4 to 6 hours, while the exemplary powder mixture of FIG. 2 b) was calcined from 850° C. to 900° C. for from 6 to 8 hours. A tetragonal phase corresponding to zirconia, and a c-type cubic phase corresponding to yttria were observed in the XRD pattern of FIG. 2 a), indicating the calcined powder mixture comprised crystalline yttria and zirconia powders. FIG. 2 b) also depicted the crystalline phases of FIG. 2 a), further comprising minority amounts of a solid solution cubic phase of yttrium zirconium oxide, observed at the higher calcination temperatures and extended calcination times, indicative of a reaction between yttria and zirconia. In some embodiments, those calcined powder mixtures comprising the starting powders of yttria and zirconia are preferable. Further embodiments may comprise the starting powders of yttria and zirconia as a majority phase, and a cubic phase of yttrium zirconium oxide as a minority phase. All x ray diffraction (XRD) was performed using a PANanlytical Aeris model XRD capable of crystalline phase identification to about +/−2% by volume.

Calcination provides for modification and optimization of particle size distribution (PSD) and specific surface area (as relates to starting powders and/or calcined powder mixtures, surface area and specific surface area (SSA) are used interchangeably herein). Table 5 discloses calcination conditions and resulting powder surface area and particle size distribution for the 80 mol % yttria and 20 mol % zirconia calcined powder mixtures as disclosed herein.

TABLE 5

| powder | calcination T (° C.) | Calcination t (hr) | d10 (um) | d50 (um) | d90 (um) | SSA (m2/g) |
|---|---|---|---|---|---|---|
| 1 | 800 | 8 | 0.12 | 1.01 | 5.86 | 4.96 |
| 2 | 1000 | 8 | 0.25 | 3.49 | 8.2 | 3.41 |
| 3 | 1200 | 8 | 1.73 | 7.73 | 86.6 | 2.93 |
| 4 | 1400 | 8 | 3.41 | >74 | >400 | 1.57 |

Calcination at temperatures of 1400° C. and higher may not be preferable due to the resulting low specific surface area (SSA) and very large particle sizes. Preferable are those calcined powder mixtures having an SSA of not less than 1.75 m2/g, more preferably not less than 2 m2/g. The large particle sizes measured at 1400° C. are indicative of particle agglomeration which may inhibit powder flowability and mixing. Thus, calcination at temperatures of 1300° C. and less are preferable, more preferable are calcination temperatures of from not less than 600° C. to not greater than 1200° C., preferably from not less than 600° C. to not greater than 1100° C. in an oxidizing environment. Any of the starting powders, the powder mixture and the calcined powder mixture may be optionally sieved using any number of meshes which may have openings of for example from 45 um to 400 um, blended and/or dry milled at various process steps according to known methods without limitation as to repetition or order.

Figure 3:
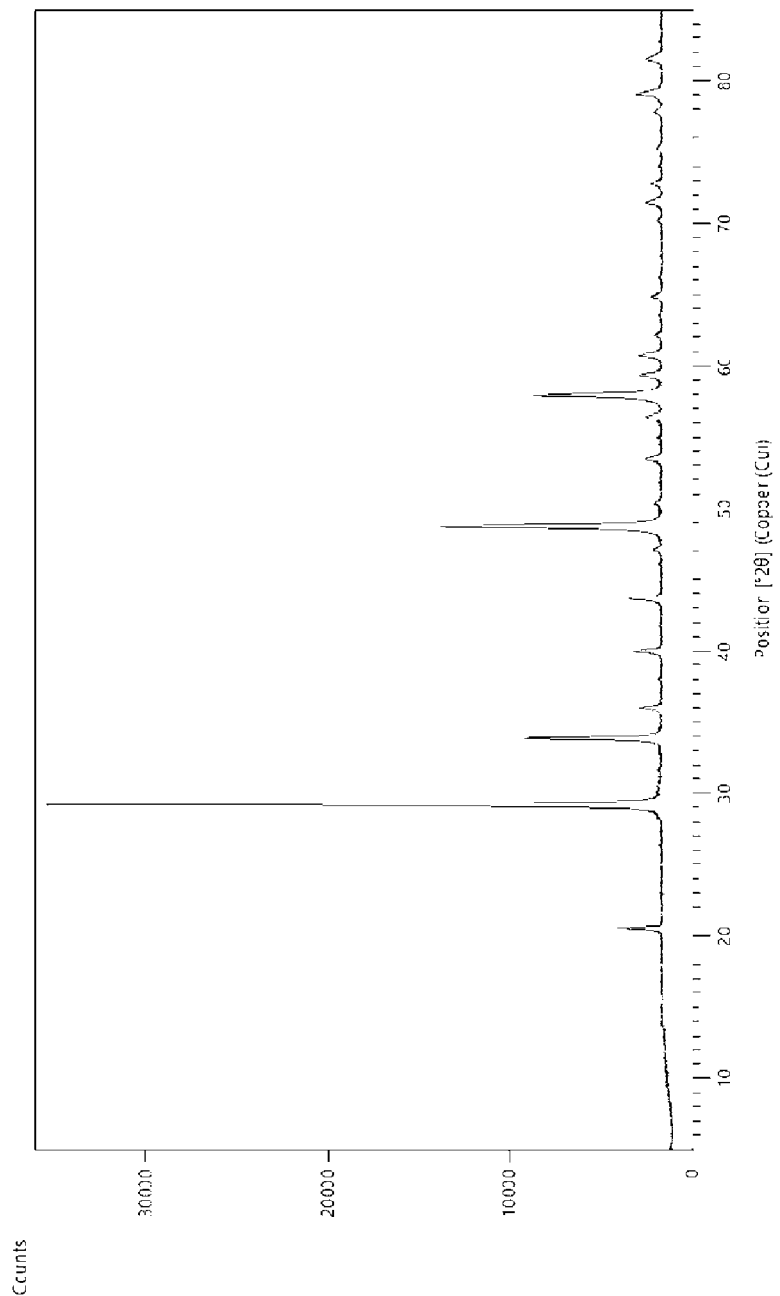
FIGS. 3) and 4) illustrate exemplary x ray diffraction results for yttria-zirconia ceramic sintered bodies as disclosed herein.

FIG. 3 illustrates x ray diffraction results for an exemplary yttria-zirconia ceramic sintered body having a composition of about 80 mol % yttria and about 20 mol % zirconia sintered at a temperature of about 1500° C. for 30 minutes at a pressure of about 30 MPa in accordance with the method as disclosed herein. X ray diffraction confirmed the presence of a cubic crystalline phase comprising at least one of fluorite and c-type yttria crystal structures.

Figure 4:
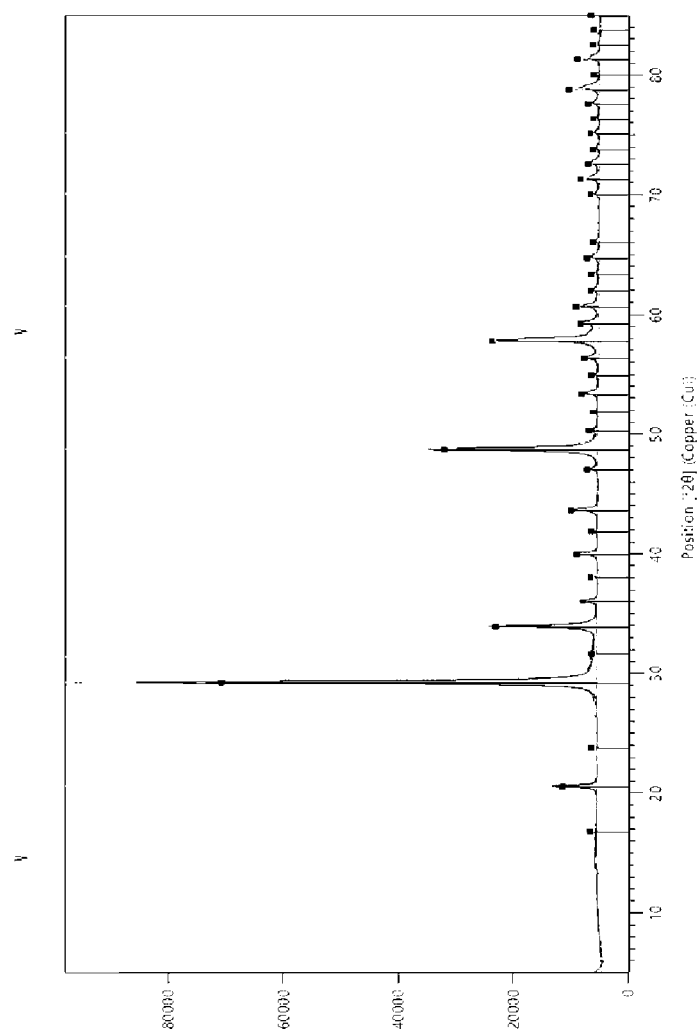

FIG. 4 illustrates x ray diffraction results for the exemplary yttria-zirconia ceramic sintered body of FIG. 3 after annealing at 1550° C. for 8 hours in an oxidizing environment. X ray diffraction confirmed no change from that of FIG. 3 in the crystalline phases present upon annealing.

Figure 5:
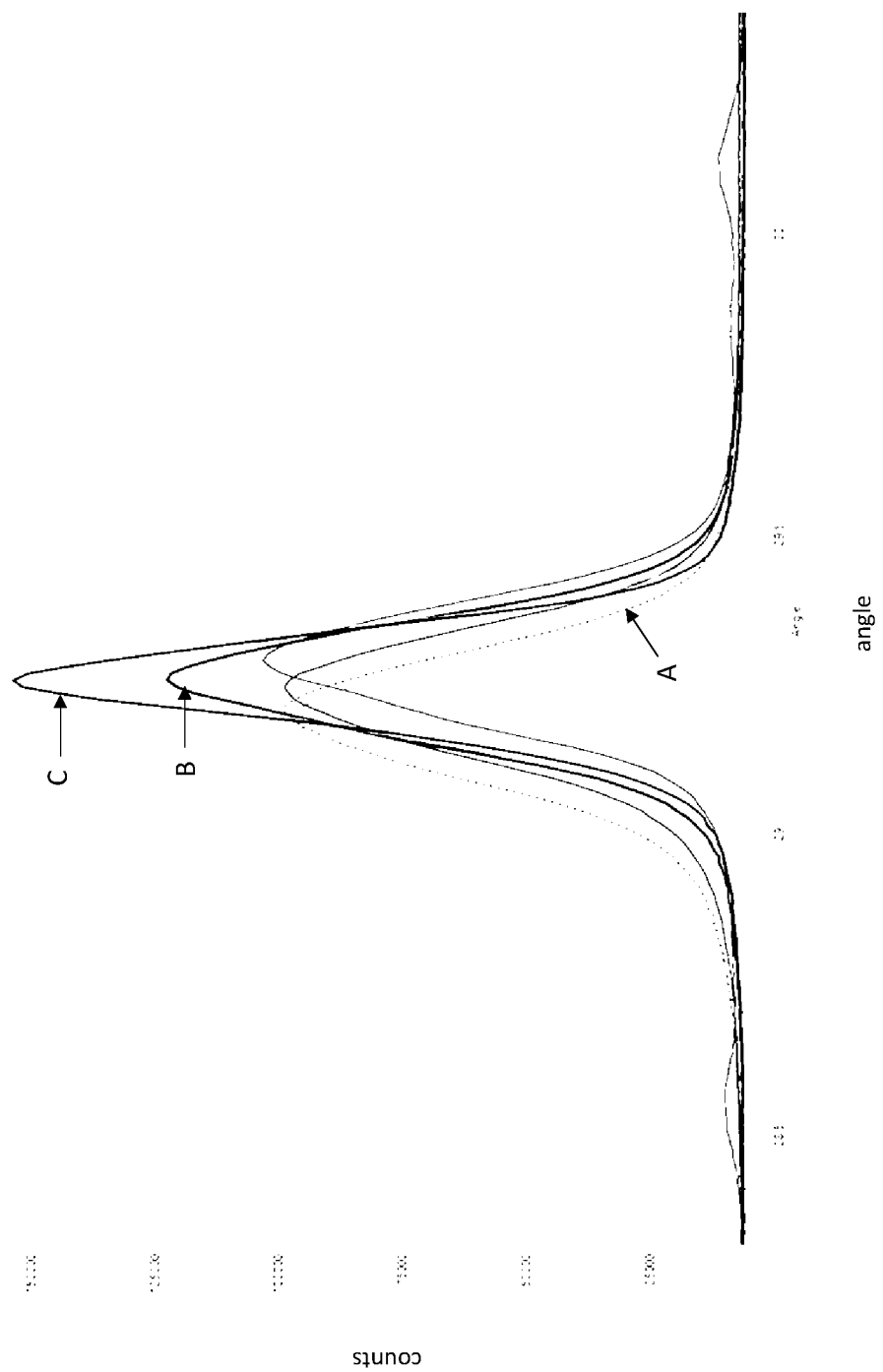
FIG. 5 shows changes in x ray diffraction results with annealing of the yttria-zirconia ceramic sintered body as disclosed herein.

FIG. 5 depicts x ray diffraction results for exemplary yttria-zirconia ceramic sintered bodies across a range of annealing conditions, from no annealing (A) to annealing temperatures of from 1100° C. (B) to 1550° C. (C). The increase in peak height and decrease in peak width indicates an increase in the crystallinity of the yttria-zirconia sintered bodies at higher annealing temperatures.

Figure 6:
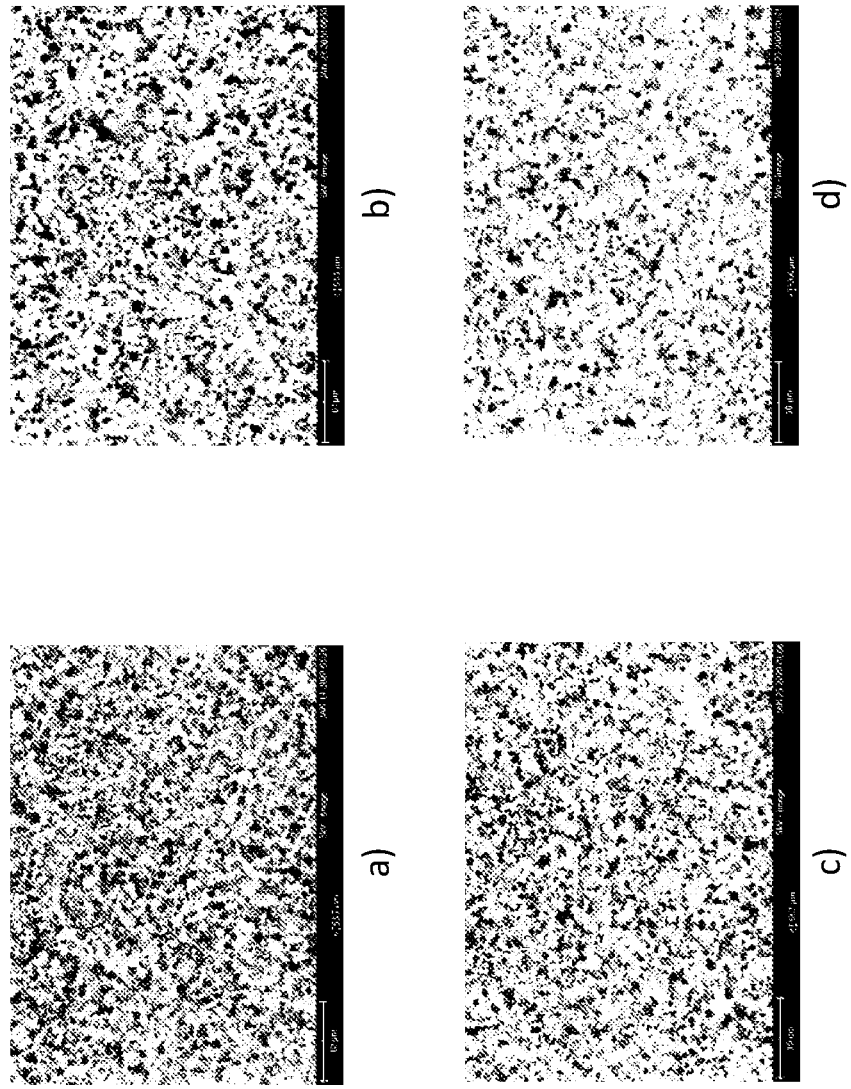
FIG. 6 illustrates exemplary microstructures at 5000× of the yttria-zirconia ceramic sintered body under different annealing conditions as disclosed herein.

FIGS. 6 a) to d) show SEM micrographs at 5000× of exemplary sintered microstructures of the yttria-zirconia sintered body as disclosed herein. FIG. 6 a) illustrates an exemplary microstructure after sintering at a temperature of 1500° C. and a pressure of 30 MPa for 30 minutes; FIG. 6 b) illustrates an exemplary microstructure after sintering according to a), and annealing at 1000° C. for 8 hours; FIG. 6 c) illustrates an exemplary microstructure after sintering according to a), and annealing at 1200° C. for 8 hours, and FIG. 6 d) illustrates an exemplary microstructure after sintering according to a), and annealing at 1400° C. for 8 hours. No pores are visible in the microstructures, indicating a very high (>98.5% of theoretical) density.

Very small grain sizes may be observed in the SEM images of FIGS. 6 a) to d). Grain sizes were measured according to the Heyn Linear Intercept Procedure described in ASTM standard E112-2010 "Standard Test Method for Determining Average Grain Size." Maximum grain sizes may be less than 8 um, preferably less than 5 um, and preferably from 3 to 8 um. Grain sizes as measured in "um" herein means a value of 106 meters. An average grain size was measured of from 0.5 to less than 3 um, preferably from 0.5 to less than 2 um, preferably from 0.5 to 1 um, and more preferably from 0.4 to less than 2 um. The SEM micrograph of FIG. 6 a) (no annealing) was measured to have an average grain size of about 0.7 um, while the micrograph of FIG. 6 d) (annealed at 1400° C. for 8 hours) was measured to have a very similar grain size as that of FIG. a), having an average grain size of about 0.8 um. These fine grain sizes provide yttria-zirconia, ceramic sintered bodies having improved mechanical strength and resistance to microcracking and/or spalling during machining and during use as components in plasma processing chambers.

The combination of high density/low porosity, small grain size and high purity of the yttria zirconia ceramic sintered bodies (and components fabricated therefrom) provides advantages over other ceramic materials when used in semiconductor processing applications. These include enhanced resistance to the effects of erosion and corrosion resulting from plasma etch and deposition processing (plasma resistance) and improved mechanical strength.

Figure 7:
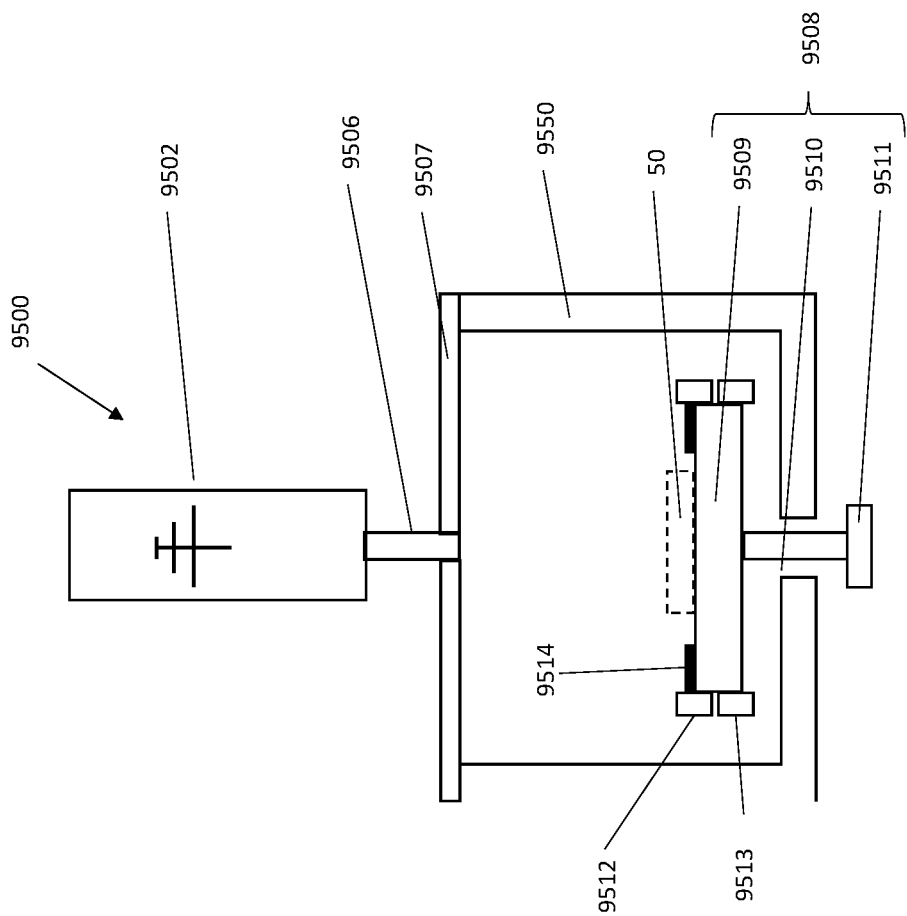
FIG. 7 illustrates a first example of a semiconductor processing chamber.
Figure 8:
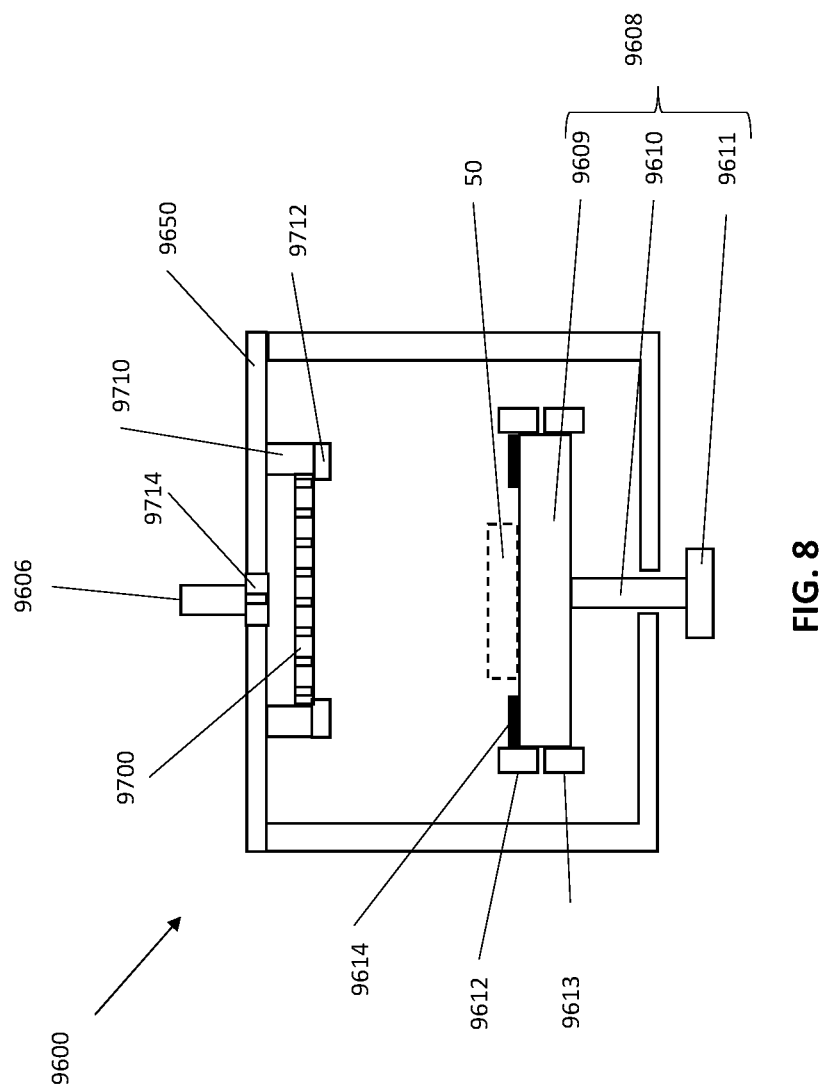
FIG. 8 illustrates a second example of a semiconductor processing chamber.

Embodiments as disclosed herein include a ceramic sintered body and components fabricated therefrom adapted for use in exemplary semiconductor processing chambers as depicted in FIGS. 7 and 8.

As shown in the sectional view of FIG. 7, embodiments of the technology as disclosed herein may include a semiconductor processing system 9500, also denoted as processing system. Processing system 9500 may include a remote plasma region. The remote plasma region may include a plasma source 9502, which is also denoted as remote plasma source ("RPS").

Processing system 9500, which may represent a capacitively coupled plasma processing apparatus, comprises a vacuum chamber 9550 having a corrosion resistant chamber liner (not shown), a vacuum source, and a chuck 9508 on which a wafer 50, also denoted as semiconductor substrate, is supported. A cover ring 9514 and a top shield ring 9512 surrounds the wafer 50 and puck 9509. A window or lid 9507 forms an upper wall of the vacuum chamber 9550. Window/lid 9507, gas distribution system 9506, cover ring 9514, top shield ring 9512, focus ring (not shown), chamber liner (not shown), and puck 9509 may be made fully or in part from embodiments of the ceramic sintered body as disclosed herein, comprising from not less than 75 mol % to not greater than 95 mol % yttria, and from not less than 5 mol % to not greater than 25 mol % zirconia, and compositions within these ranges as disclosed herein. The terms "window" and "lid" are taken to have the same meaning, and thus used synonymously herein. Embodiments of ring components, such as a cover ring, shield ring, process ring, etc. may comprise any number of ring components as known to those skilled in the art.

The remote plasma source 9502 is provided outside of the window 9507 of the chamber 9550 for accommodating the wafer 50 to be processed. The remote plasma region may be in fluid communication with the vacuum chamber 9550 through gas delivery system 9506. In the chamber 9550, a capacitively coupled plasma may be generated by supplying a processing gas to the chamber 9550 and a high frequency power to the plasma source 9502. By using the capacitively coupled plasma thus generated, a predetermined plasma processing is performed on the wafer 50. A planar antenna having a predetermined pattern is widely used for the high frequency antenna of the capacitively coupled processing system 9500.

As shown in the sectional view of FIG. 8, another embodiment of the technology as disclosed herein may include a semiconductor processing system 9600, also called processing system. Processing system 9600, which may represent an inductively coupled plasma processing apparatus, comprises a vacuum chamber 9650, a vacuum source, and a chuck 9608 on which a wafer 50, also denoted as semiconductor substrate, is supported. A showerhead 9700 forms an upper wall or is mounted beneath an upper wall of the vacuum chamber 9650. The ceramic showerhead 9700 includes a gas plenum in fluid communication with a plurality of showerhead gas outlets for supplying process gas to the interior of the vacuum chamber 9650. The showerhead 9700 is in fluid communication with a gas delivery system 9606. Furthermore, the showerhead 9700 may comprise a central opening configured to receive a central gas injector, also referred equivalently to as a nozzle, 9714. An RF energy source energizes the process gas into a plasma state to process the semiconductor substrate. The flow rate of the process gas supplied by the central gas injector 9714 and the flow rate of the process gas supplied by the ceramic showerhead can be independently controlled. The showerhead or gas distribution plate 9700, the gas delivery system 9606 and the central gas injector 9714 may be made from embodiments of the ceramic sintered body as disclosed herein, comprising not less than 75 mol % to not greater than 95 mol % yttria, and not less than 5 mol % to not greater than 25 mol % zirconia and compositions within these ranges as disclosed herein.

System 9600 may further include an electrostatic chuck 9608 that is designed to carry a wafer 50. The chuck 9608 may comprise a puck 9609, for supporting the wafer 50. The puck 9609 may be formed from a dielectric material and may have a chucking electrode disposed within the puck proximate a support surface of the puck 9609 to electrostatically retain the wafer 50 when disposed on the puck 9609. The chuck 9608 may comprise a base 9611 having a ring-like extending to support the puck 9609; and a shaft 9610 disposed between the base and the puck to support the puck above the base such that a gap is formed between the puck 9609 and the base 9610, wherein the shaft 9610 supports the puck proximate a peripheral edge of the puck 9609. Chuck 9608 and puck 9609 may be made from embodiments of the ceramic sintered body as disclosed herein, comprising not less than 75 mol % to not greater than 95 mol % yttria, and not less than 5 mol % to not greater than 25 mol % zirconia and compositions within these ranges as disclosed herein. Chuck 9608 may comprise an electrostatic chuck (ESC) and other embodiments beyond those disclosed as known to those skilled in the art.

Parts of the surface of the showerhead 9700 may be covered with a shield ring 9712. Parts of the surface of the showerhead 9700, especially radial sides of the surface of the showerhead 9700 may be covered with a top shield ring 9710. Shield ring 9712 and top shield ring 9710 may be made from embodiments of the ceramic sintered body as disclosed herein, comprising not less than 75 mol % to not greater than 95 mol % yttria, and not less than 5 mol % to not greater than 25 mol % zirconia and compositions within these ranges as disclosed herein.

Parts of the supporting surface of the puck 9609 may be covered with a cover ring 9614. Further parts of the surface of the puck 9609 may be covered with a top shield ring 9612 and/or a shield ring 9613. Shield ring 9613, cover ring 9614 and top shield ring 9612 may be made from embodiments of the ceramic sintered body as disclosed herein, comprising not less than 75 mol % to not greater than 95 mol % yttria, and not less than 5 mol % to not greater than 25 mol % zirconia and compositions within these ranges as disclosed herein.

The embodiments of the ceramic sintered body as disclosed herein can be combined in any specific ceramic sintered body. Thus, two or more of the characteristics disclosed herein can be combined to describe the ceramic sintered body in more detail as, for example, outlined in the embodiments.

The inventors determined that the above-described ceramic sintered body and related corrosion resistant sintered components have an improved behaviour in etch and deposition processes and improved ability to be handled and can easily be used as materials for the preparation of components for use in plasma processing chambers.

The yttria and zirconia materials used for plasma processing chamber parts until today suffer, as already mentioned above, from the main problem that under harsh etching and deposition conditions particles are generated which contaminate the products to be processed. Owing to the inherently low mechanical strength of yttrium and zirconium oxides, it is difficult to produce solid body, phase-pure, high strength parts of large dimension (from 200 mm to 622 mm in greatest dimension or diameter) formed of high purity sintered bodies comprising yttrium oxide and zirconium oxide which are free of defects, cracks, or microcracks (cracks not visually apparent by eye).

In contrast to this, the present technology provides a new concept to manufacture corrosion resistant components for use in plasma processing chambers and focus on the purity, density, crystalline phase, grain size and handleability. According to the present disclosure, it was determined that the porosity characteristics, density and grain size may have an important influence on the etch and deposition stability in addition to the bulk (percentage) porosity characteristics of the yttria and zirconia materials as disclosed herein.

The aforementioned ceramic sintered body, comprising crystalline phases of yttrium oxide and zirconium oxide, and combinations thereof, may lend itself to fabrication of large corrosion resistant components of dimensions from 10 mm to 622 mm, with regard to the longest extension of the sintered body. The large component dimensions described herein may be enabled by the increased density, low porosity and fine grain size of the ceramic sintered body from which chamber components may be fabricated.

The use in semiconductor processing chambers of a ceramic sintered body made of crystalline phases of yttrium oxide and zirconium oxide and combinations thereof results in a sintered material which displays improved plasma corrosion and erosion resistance ("plasma resistance") over other materials when subjected to halogen-based plasma processing conditions as well as under deposition conditions.

EXAMPLES

The following examples are included to more clearly demonstrate the overall nature of the disclosure. These examples are exemplary, not restrictive, of the disclosure.

Example 1 (Sample 1, Table 1) A powder of yttria having a surface area of 2-4 $m^2/g$ and a powder of zirconia having a surface area of 6-8 $m^2/g$ were weighed and combined to create a powder mixture in a ratio of 80 mol % yttria and 20 mol % zirconia (amounts by weight of 87.3% yttria and 12.7% zirconia). The purity of the yttria powder was greater than about 99.998% and the purity of the zirconia powder was greater than about 99.79% as measured using ICP-MS methods disclosed herein. 50% by powder weight of ethanol and 100% by powder weight of zirconia media were added to the powder mixture to form a slurry. The slurry was end-over-end/tumble mixed at an RPM of from 10 to 30 rpm for 12 hours. The ethanol was extracted from the slurry using a rotary evaporator at a temperature of about 75° C. until dry. Any of the starting powders, the powder mixture and the calcined powder mixture may be optionally sieved using any number of meshes which may have openings of for example from 45 um to 400 um, blended and/or dry milled at various process steps according to known methods without limitation as to repetition or order.

The powder mixture was calcined at 850° C. for 6 hours in air. The calcined powder mixture was then sintered at a sintering temperature of 1625° C., a pressure of 25 MPa for a sintering time of 90 minutes under vacuum in accordance with the method as disclosed herein to form a ceramic sintered body in a disk shape having a diameter of 406 mm. The ceramic sintered body was annealed at 1400° C. for about 8 hours. Density measurements were performed according to ASTM B962-17 and an average density of 5.10 g/cc, corresponding to 99.4% of the theoretical density for a ceramic sintered body comprising 80 mol % yttria/20 mol % zirconia (the theoretical density as disclosed herein is 5.13 g/cc), was measured. The ceramic sintered body comprised porosity (also referred to herein as volumetric porosity, Vp) in an amount of 0.6%. Density measurements taken across the ceramic sintered body measured a difference in density (relative to theoretical density) across the diameter of not greater than 2%.

Example 2 (Sample 2, Table 1) A ceramic sintered body was formed in a disk shape having a diameter of 406 mm according to the materials and methods as disclosed in Example 1 with the exception that annealing was not performed. Density measurements were performed according to ASTM B962-17 and an average density of 5.13 g/cc, corresponding to 100% of the theoretical density of a ceramic sintered body comprising 80 mol % yttria/20 mol % zirconia, was measured. The ceramic sintered body was free of porosity (also referred to herein as volumetric porosity, Vp).

Example 3 (Sample 3, Table 1) A powder mixture was formed and dried according to the amounts, materials and methods of Example 1. Calcination of the powder mixture was performed at 950° C. for 6 hours in air. The calcined powder mixture was then sintered at a sintering temperature of 1600° C., a pressure of 15 MPa for a sintering time of 30 minutes under vacuum in accordance with the methods as disclosed herein to form a ceramic sintered body in a disk shape having a diameter of 150 mm. Density measurements were performed according to ASTM B962-17 and an average density of 5.11 g/cc, corresponding to 99.6% of the theoretical density of a ceramic sintered body comprising 80 mol % yttria/20 mol % zirconia, was measured. The ceramic sintered body comprised porosity (also referred to herein as volumetric porosity, Vp) in an amount of 0.4%.

Example 4 (Sample 4, Table 1) A ceramic sintered body was formed in accordance with the materials and methods of Example 3. The ceramic sintered body was annealed for 8 hours in an oxygen containing environment at a temperature of 1200° C. Density measurements were performed according to ASTM B962-17 and an average density of 5.11 g/cc, corresponding to 99.6% of the theoretical density of an annealed ceramic sintered body comprising 80 mol % yttria/20 mol % zirconia, was measured. The ceramic sintered body comprised porosity (also referred to herein as volumetric porosity, Vp) in an amount of 0.4%.

Example 5 (Sample 5, Table 1) A ceramic sintered body was formed in accordance with the materials and methods of Example 3. The ceramic sintered body was further annealed for 8 hours in an oxygen containing environment at a temperature of 1300° C. Density measurements were performed according to ASTM B962-17 and an average density of 5.09 g/cc, corresponding to 99.2% of the theoretical density of a ceramic sintered body comprising 80 mol % yttria/20 mol % zirconia, was measured. The ceramic sintered body comprised porosity (also referred to herein as volumetric porosity, Vp) in an amount of 0.8%.

Example 6 (Sample 6, Table 1) A powder mixture was formed and dried according to the materials and methods of Example 1 with the exception that 35% by powder weight of ethanol and 100% by powder weight of zirconia media were added to the powder mixture to form a slurry. Calcination was performed at 850° C. for 6 hours in air. The calcined powder mixture was then sintered at a sintering temperature of 1450° C., a pressure of 20 MPa for a sintering time of 30 minutes under vacuum in accordance with the methods as disclosed herein to form a ceramic sintered body in a disk shape having a diameter of 150 mm. The ceramic sintered body was annealed for 8 hours in an oxygen containing environment at a temperature of 1300° C. Density measurements were performed according to ASTM B962-17 and an average density of 5.11 g/cc, corresponding to 99.6% of the theoretical density of a ceramic sintered body comprising 80 mol % yttria/20 mol % zirconia, was measured. The ceramic sintered body comprised porosity (also referred to herein as volumetric porosity, Vp) in an amount of 0.4%.

Example 7 (Sample 7 of Table 1) A calcined powder mixture was formed as disclosed in Example 1. The calcined powder mixture was then sintered at a sintering temperature of 1500° C., a pressure of 30 MPa for a sintering time of 30 minutes under vacuum in accordance with the methods as disclosed herein to form a ceramic sintered body in a disk shape having a diameter of 100 mm. Density measurements were performed according to ASTM B962-17 and an average density of 5.13 g/cc, corresponding to 100% of the theoretical density of a ceramic sintered body comprising 80 mol % yttria/20 mol % zirconia, was measured. The ceramic sintered body was free of porosity.

Example 8 (Sample 8 of Table 1) A powder of yttria having a surface area of 6-8 m²/g and a powder of zirconia having a surface area of 6-8 m²/g were weighed and combined to create a powder mixture in a ratio of 90 mol % yttria and 10 mol % zirconia. A slurry was formed by adding about 35 wt % ethanol relative to the powder mixture weight, and zirconia media added at 100% loading relative to powder weight. The powder mixture was ball milled for about 12 hours at an RPM of about 125. The powder mixture was calcined at 1000° C. for 8 hours in air. The calcined powder mixture was then sintered at a sintering temperature of 1500° C., a pressure of 30 MPa for a sintering time of 30 minutes under vacuum in accordance with the methods as disclosed herein to form a ceramic sintered body in a disk shape having a diameter of 100 mm. Density measurements were performed according to ASTM B962-17 and an average density of 5.08 g/cc, corresponding to 100% of the theoretical density of a ceramic sintered body comprising 90 mol % yttria/10 mol % zirconia, was measured. The ceramic sintered body was free of porosity.

TABLE 1

| Sample | T (° C.) | P (MPa) | t (min) | Anneal (T/t) | Density (g/cc) | % RD | Vp (%) |
|---|---|---|---|---|---|---|---|
| 1 | 1625 | 25 | 90 | 1400/8 | 5.10 | 99.4% | 0.60 |
| 2 | 1625 | 25 | 90 | N/A | 5.13 | 100.0% | ~0 |
| 3 | 1600 | 15 | 30 | N/A | 5.11 | 99.6% | 0.40 |
| 4 | 1600 | 15 | 30 | 1200/8 | 5.11 | 99.6% | 0.40 |
| 5 | 1600 | 15 | 30 | 1300/8 | 5.09 | 99.2% | 0.80 |
| 6 | 1450 | 20 | 30 | 1300/8 | 5.11 | 99.6% | 0.40 |
| 7 | 1500 | 30 | 30 | N/A | 5.13 | 100% | ~0 |
| 8* | 1500 | 30 | 30 | N/A | 5.08 | 100%* | ~0 |

Examples 9 and 10 A calcined powder mixture was made according to the disclosure of Example 1. The calcined powder mixture was sintered at a sintering temperature of 1600° C., a pressure of 15 MPa for a sintering time of 45 minutes under vacuum in accordance with the methods as disclosed herein to form a ceramic sintered body in a disk shape having a diameter of 406 mm corresponding to Sample 9. The ceramic sintered body of sample 9 was further annealed at 1400° C. for 8 hours in air. Sample 10 was formed from the calcined powder mixture of Example 1 by sintering at a sintering temperature of 1625° C., a pressure of 20 MPa for a sintering time of 60 minutes under vacuum in accordance with the methods as disclosed herein to form a ceramic sintered body in a disk shape having a diameter of 406 mm. Dielectric constant and dissipation factor were measured according to ASTM D-150 at a frequency of 1 MHz and ambient temperature and the results are as listed following. Within the scope of the measurements performed, the same dielectric performance was measured for yttria zirconia ceramic sintered bodies which were annealed and those which were not annealed.

| Sample | dissipation factor | dielectric constant | T (° C.) | P (MPa) | t (min) | Anneal (T(° C.)/t, hr) |
|---|---|---|---|---|---|---|
| 9 | 0.0001 | 12.7 | 1600 | 15 | 45 | 1400/8 |
| 10 | 0.0001 | 12.7 | 1625 | 20 | 60 | no anneal |

Example 11 A calcined powder mixture was formed in accordance with the disclosure of Example 1. The calcined powder mixture was sintered at a sintering temperature of 1625° C., a pressure of 15 MPa for a sintering time of 90 minutes under vacuum in accordance with the methods as disclosed herein to form an intact, 80 mol % yttria, 20 mol % zirconia ceramic sintered body in a disk shape having a diameter of 572 mm which was easily handled. The sintered ceramic body was annealed at 1400° C. for 10 minutes in an oxygen containing atmosphere. Thereafter, density measurements were performed on the sintered body in accordance with ASTM B962-17. A density of 5.13 g/cc was measured, corresponding to about 100% of the theoretical density (taken herein to be 5.13 g/cc) for the sintered body comprising 80 mol % yttria and 20 mol % zirconia. Surface roughness measurements were performed using a Keyence 3D laser scanning confocal digital microscope model VK-X250X The ISO 25178 Surface Texture (Areal Roughness Measurement) is a collection of international standards relating to the analysis of surface roughness with which this microscope is compliant. The parameters of Sa (arithmetical mean height) and Sz (maximum height/peak to valley) were measured on the sintered ceramic body. Sa represents an average roughness value calculated across a user-defined area of a surface of the sintered ceramic body. Sz represents the maximum peak-to-valley distance across a user-defined area of a surface of the sintered ceramic body. The surface roughness features of Sa and Sz are well-known parameters in the underlying technical field and, for example, described in ISO standard 25178-2-2012.

Sa values of less than 90 nm, more preferably less than 70 nm, more preferably less than 50 nm, more preferably less than 25 nm, and preferably less than 15 nm, were measured on a polished surface according to ISO standard 25178-2-2012.

Sz values of less than 3.5 um, preferably less than 2.5 um, preferably less than 2 um, preferably less than 1.5 um, and more preferably less than 1 um, were measured on a polished surface according to ISO standard 25178-2-2012.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges.

What is claimed is:
1. A ceramic sintered body comprising:
yttrium oxide and zirconium oxide, wherein the ceramic sintered body comprises not less than 75 mol % to not greater than 95 mol % yttrium oxide and not less than 5 mol % to not greater than 25 mol % zirconium oxide, wherein the ceramic sintered body comprises porosity in an amount of less than 2% by volume, wherein a density of the ceramic sintered body does not vary by more than 2% relative to theoretical density across a greatest dimension, and wherein the ceramic sintered body has an average grain size of from 0.4 to less than 2 μm as measured according to ASTM E1 12-2010.

2. The ceramic sintered body of claim 1 having at least one surface comprising yttrium oxide and zirconium oxide wherein the at least one surface is polished and comprises porosity in an amount of less than 2% by pore area of the at least one surface.

3. The ceramic sintered body of claim 2 wherein porosity as measured on a polished surface extends throughout the ceramic sintered body.

4. The ceramic sintered body of claim 1 having a pore diameter of not less than 0.1 to not greater than 3 μm as measured across a polished surface.

5. The ceramic sintered body of claim 1 having at least one surface with an average grain size of from 0.75 μm to 6 μm as measured according to ASTM E1 12-2010.

6. The ceramic sintered body of claim 1 comprising a c-type cubic solid solution phase.

7. The ceramic sintered body of claim 1 having the greatest dimension of from 100 mm to 622 mm with regard to the longest extension of the sintered body.

8. A method of making a ceramic sintered body according to claim 1, the method comprising the steps of:
   a. combining powders of yttrium oxide and zirconium oxide to make a powder mixture;
   b. calcining the powder mixture by applying heat to raise the temperature of the powder mixture to a calcination temperature and maintaining the calcination temperature to form a calcined powder mixture;
   c. disposing the calcined powder mixture inside a volume defined by an electrically conductive tool set of a sintering apparatus and creating vacuum conditions inside the volume;
   d. applying pressure to the calcined powder mixture while employing a direct current to heat the electrically conductive tool set to a sintering temperature and performing sintering to form the ceramic sintered body; and
   e. lowering the temperature of the ceramic sintered body.

9. The method according to claim 8 further comprising the steps of:
   f. optionally annealing the ceramic sintered body by applying heat to raise the temperature of the ceramic sintered body to reach an annealing temperature to form an annealed ceramic sintered body; and
   g. lowering the temperature of the annealed ceramic sintered body.

10. The method according to claim 8 further comprising the step of:
   h. optionally machining the ceramic sintered body to form a ceramic sintered body component such as a window, an RF window, a lid, a focus ring, a shield ring, a nozzle, a gas injector, a shower head, a gas distribution plate, a chamber liner, a chuck, an electrostatic chuck, a puck, and/or a cover ring in plasma processing chambers.

11. The method according to claim 8 wherein the calcined powder mixture has a purity of 99.99% and higher relative to 100% purity as measured using ICP-MS methods.

12. The method according to claim 8 wherein the calcined powder mixture has a specific surface area (SSA) of from 2 to 14 $m^2/g$ as measured according to ASTM C1274.

13. The method according to claim 8 wherein the calcination temperature is from 600° C. to 1200° C.

14. The method according to claim 8 wherein the pressure is from 10 to 60 MPa.

15. The method according to claim 8 wherein the sintering temperature is from 1200° C. to 1700° C.

* * * * *